US006973612B1

(12) United States Patent
Rodi

(10) Patent No.: US 6,973,612 B1
(45) Date of Patent: Dec. 6, 2005

(54) FAMILIAL CORRECTION WITH NON-FAMILIAL DOUBLE BIT ERROR DETECTION FOR DIRECTORY STORAGE

(75) Inventor: Eugene A. Rodi, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 630 days.

(21) Appl. No.: 10/012,638

(22) Filed: Nov. 13, 2001

(51) Int. Cl.[7] .............................................. H03M 13/00
(52) U.S. Cl. ...................................... 714/766; 714/785
(58) Field of Search ................................ 714/753, 755, 714/757, 763, 773, 766, 781, 785

(56) References Cited

U.S. PATENT DOCUMENTS 5,490,155 A * 2/1996 Abdoo et al. ................ 714/763
5,682,394 A * 10/1997 Blake et al. .................. 714/763
5,757,823 A * 5/1998 Chen et al. ................... 714/752
6,018,817 A * 1/2000 Chen et al. ................... 714/762

6,453,440 B1 * 9/2002 Cypher ........................ 714/758

* cited by examiner

Primary Examiner—Shelley A Chase
(74) Attorney, Agent, or Firm—Michael B. Atlass; Mark T. Starr

(57) ABSTRACT

Error correction and error detection related to DRAM chip failures, particularly adapted server memory subsystems. The application of a code for 128 bit memories is applied to a 20 bit directory store to improve reliability of the directory store memory of the computer system. The code uses ×4 bit DRAM devices organized in a code word of 20 data bit words and 12 check bits. These 12 check bits provide a code capable of 4 bit adjacent error correction within a family (i.e., in a ×4 DRAM) and double bit non-adjacent error detection across the entire 20 bit word, with single bit correction across the word as well. Each device can be though of as a separate family of bits, errors occurring in more than one family are not correctable, but may be detected if only one bit in each of two families is in error. Syndrome generation and regeneration are used together with a specific large code word. Decoding the syndrome and checking it against the regenerated syndrome yield data sufficient for providing the features described.

22 Claims, 25 Drawing Sheets

| RAM X | | | | |
|---|---|---|---|---|
| 3 | 2 | 1 | 0 | |
| 1 | | | | S3 |
| | 1 | | | S2 |
| | | 1 | | S1 |
| | | | 1 | S0 |
| 1 | 1 | | | D5 |
| 1 | | 1 | | D4 |
| 1 | | | 1 | D3 |
| | 1 | 1 | | D2 |
| | 1 | | 1 | D1 |
| | | 1 | 1 | D0 |
| | 1 | 1 | 1 | T3 |
| 1 | | 1 | 1 | T2 |
| 1 | 1 | | 1 | T1 |
| 1 | 1 | 1 | | T0 |
| 1 | 1 | 1 | 1 | Q0 |
| 0 | 0 | 0 | 0 | NO ERR |

Table 10 – RAM Error Definition

| | ECC 0 | ECC 1 | ECC 2 | ECC 3 | ECC 4 | ECC 5 | ECC 6 | ECC 7 | ECC 8 | ECC 9 | ECC 10 | ECC 11 | ECC 12 | ECC 13 | ECC 14 | ECC 15 |
|---|---|---|---|---|---|---|---|---|---|---|---|---|---|---|---|---|
| 64 | 1 | 1 | | 1 | 1 | 1 | | | 1 | 1 | | 1 | | | | 1 |
| 65 | | | | 1 | | 1 | 1 | 1 | | | 1 | | | | 1 | |
| 66 | 1 | | 1 | | | 1 | 1 | 1 | | | 1 | | | 1 | | |
| 67 | | 1 | 1 | | 1 | 1 | | 1 | | 1 | 1 | | 1 | | | |
| 68 | 1 | 1 | | 1 | 1 | 1 | | 1 | | 1 | | 1 | | | | 1 |
| 69 | | | | 1 | | | 1 | | | 1 | | 1 | | | 1 | |
| 70 | 1 | | | 1 | 1 | | 1 | | 1 | | | | | 1 | | |
| 71 | | 1 | 1 | | 1 | 1 | | 1 | | 1 | 1 | 1 | | | | |
| 72 | 1 | 1 | | 1 | | 1 | 1 | 1 | 1 | | | | | | | 1 |
| 73 | | | | 1 | 1 | | | 1 | 1 | | 1 | | | 1 | | |
| 74 | 1 | | | 1 | | | 1 | | | 1 | 1 | | 1 | | | |
| 75 | | 1 | 1 | | 1 | | 1 | 1 | | 1 | 1 | | | | | |
| 76 | 1 | 1 | | 1 | | 1 | | 1 | | 1 | | | | | | 1 |
| 77 | | | | 1 | | 1 | 1 | 1 | | | | | | | 1 | |
| 78 | 1 | | | 1 | 1 | | | | 1 | | | | 1 | | | |
| 79 | | 1 | 1 | | 1 | | 1 | 1 | 1 | | | | 1 | | | |
| 80 | | | 1 | 1 | | 1 | | | | 1 | | | | | | 1 |
| 81 | 1 | | | | 1 | | | 1 | 1 | 1 | | | | | 1 | |
| 82 | | | 1 | | | 1 | 1 | | 1 | 1 | | 1 | | 1 | | |
| 83 | 1 | 1 | | | 1 | 1 | 1 | | | 1 | | 1 | 1 | | | |
| 84 | | | 1 | 1 | 1 | | 1 | 1 | 1 | | 1 | | | | | 1 |
| 85 | 1 | | | 1 | 1 | | | 1 | | | 1 | | | 1 | | |
| 86 | | 1 | | | | 1 | | | | | | 1 | | 1 | | |
| 87 | 1 | 1 | | | 1 | | | 1 | 1 | 1 | 1 | | | | | |
| 88 | | | 1 | 1 | 1 | 1 | | | 1 | 1 | | | | | | 1 |
| 89 | 1 | | | | 1 | 1 | 1 | 1 | | | | | | 1 | | |
| 90 | | 1 | | | 1 | 1 | | 1 | | | 1 | | | | | 1 |
| 91 | 1 | 1 | | 1 | | 1 | 1 | 1 | | | | 1 | | | | |
| 92 | | | 1 | 1 | 1 | | 1 | 1 | 1 | | | | | | | 1 |
| 93 | 1 | | | | 1 | | 1 | 1 | 1 | | | | 1 | 1 | | |
| 94 | | | 1 | | 1 | | 1 | | 1 | 1 | 1 | | 1 | | | |
| 95 | 1 | 1 | | 1 | | 1 | | 1 | | 1 | | 1 | | 1 | | |

Fig. 2B

| | ECC 0 | ECC 1 | ECC 2 | ECC 3 | ECC 4 | ECC 5 | ECC 6 | ECC 7 | ECC 8 | ECC 9 | ECC 10 | ECC 11 | ECC 12 | ECC 13 | ECC 14 | ECC 15 |
|---|---|---|---|---|---|---|---|---|---|---|---|---|---|---|---|---|
| 32 | 1 | 1 | | | 1 | | 1 | | 1 | 1 | | 1 | | | | 1 |
| 33 | | 1 | 1 | 1 | | 1 | | 1 | | | | 1 | | | 1 | |
| 34 | | | 1 | 1 | | | 1 | 1 | | | 1 | | | 1 | | |
| 35 | 1 | 1 | | | 1 | | 1 | 1 | 1 | | 1 | | | 1 | | |
| | | | | | | | | | | | | | | | | |
| 36 | 1 | 1 | | | | | | 1 | 1 | 1 | | | | | | 1 |
| 37 | | 1 | 1 | 1 | | | | | 1 | 1 | | | | | 1 | |
| 38 | | | 1 | 1 | | | | | 1 | | | 1 | | | | |
| 39 | 1 | 1 | | 1 | | | 1 | | | 1 | 1 | | | | | |
| | | | | | | | | | | | | | | | | |
| 40 | 1 | 1 | | | 1 | 1 | | | | | | | | | | 1 |
| 41 | | 1 | 1 | 1 | | 1 | 1 | 1 | | | | | | | 1 | |
| 42 | | | 1 | 1 | | | 1 | 1 | | | | | | 1 | | |
| 43 | 1 | 1 | | | 1 | 1 | 1 | | 1 | | | | | 1 | | |
| | | | | | | | | | | | | | | | | |
| 44 | 1 | 1 | | | | 1 | 1 | | | 1 | | 1 | | | | 1 |
| 45 | | 1 | 1 | 1 | 1 | | | | 1 | 1 | | | | | 1 | |
| 46 | | | 1 | 1 | | | 1 | | | | | 1 | | 1 | | |
| 47 | 1 | 1 | | 1 | 1 | 1 | | | 1 | | | | 1 | | | |
| | | | | | | | | | | | | | | | | |
| 48 | 1 | 1 | | | | 1 | | 1 | | 1 | 1 | | | | | 1 |
| 49 | | 1 | 1 | 1 | | | 1 | 1 | 1 | | | 1 | | | 1 | |
| 50 | | 1 | 1 | | 1 | | | 1 | | | | | 1 | | | |
| 51 | 1 | 1 | | | 1 | 1 | 1 | 1 | | | 1 | | | 1 | | |
| | | | | | | | | | | | | | | | | |
| 52 | 1 | 1 | | 1 | | | | | 1 | | | | | | | 1 |
| 53 | | | | 1 | | | | | 1 | | 1 | | | | 1 | |
| 54 | 1 | | | 1 | | | | | 1 | 1 | | | 1 | | | |
| 55 | | 1 | 1 | | | | | 1 | 1 | 1 | | 1 | | | | |
| | | | | | | | | | | | | | | | | |
| 56 | 1 | 1 | | | 1 | 1 | | | | | | | | | | 1 |
| 57 | | | | 1 | 1 | 1 | 1 | | | | | | | | 1 | |
| 58 | 1 | | | | 1 | 1 | 1 | | | | | | | 1 | | |
| 59 | | 1 | 1 | | | 1 | | 1 | | | | | 1 | | | |
| | | | | | | | | | | | | | | | | |
| 60 | 1 | 1 | | 1 | 1 | | 1 | 1 | 1 | | | | | | | 1 |
| 61 | | | 1 | 1 | 1 | | 1 | 1 | 1 | | | | | | 1 | |
| 62 | 1 | | | 1 | | | 1 | | 1 | | 1 | | | 1 | | |
| 63 | | 1 | 1 | | | 1 | 1 | | 1 | | 1 | 1 | | | | |

| | ECC0 | ECC1 | ECC2 | ECC3 | ECC4 | ECC5 | ECC6 | ECC7 | ECC8 | ECC9 | ECC10 | ECC11 | ECC12 | ECC13 | ECC14 | ECC15 |
|---|---|---|---|---|---|---|---|---|---|---|---|---|---|---|---|---|
| 00 | 1 | | 1 | 1 | | | 1 | | 1 | | 1 | | | | | 1 |
| 01 | 1 | 1 | | | | 1 | 1 | | 1 | | 1 | | | 1 | | |
| 02 | | | | 1 | 1 | 1 | | | | 1 | | | 1 | | | |
| 03 | | | 1 | 1 | | 1 | 1 | | 1 | 1 | | 1 | | | | |
| | | | | | | | | | | | | | | | | |
| 04 | 1 | | 1 | 1 | | | | 1 | | | | | | | | 1 |
| 05 | 1 | 1 | | | | 1 | 1 | | | | 1 | | | 1 | | |
| 06 | | | 1 | | | | 1 | 1 | 1 | | | | 1 | | | |
| 07 | | | 1 | 1 | | | | | 1 | 1 | 1 | | | | | |
| | | | | | | | | | | | | | | | | |
| 08 | 1 | | 1 | 1 | | | 1 | 1 | 1 | | | | | | | 1 |
| 09 | 1 | 1 | | | 1 | 1 | | | 1 | | 1 | | | 1 | | |
| 10 | | | 1 | | 1 | | 1 | 1 | | | | 1 | | | | |
| 11 | | | 1 | 1 | 1 | | 1 | 1 | | | 1 | | | | | |
| | | | | | | | | | | | | | | | | |
| 12 | | | 1 | 1 | | 1 | 1 | | 1 | | | | | | | 1 |
| 13 | | 1 | 1 | | 1 | 1 | 1 | | 1 | | | | | 1 | | |
| 14 | | 1 | | 1 | | 1 | | | 1 | | | 1 | | | | |
| 15 | 1 | | | 1 | 1 | | | 1 | 1 | 1 | 1 | | | | | |
| | | | | | | | | | | | | | | | | |
| 16 | | | | 1 | | 1 | 1 | | 1 | | 1 | | | | | 1 |
| 17 | | 1 | 1 | | 1 | | 1 | 1 | 1 | | 1 | | | 1 | | |
| 18 | | 1 | | 1 | | 1 | | | 1 | | | 1 | | | | |
| 19 | 1 | | | 1 | | | 1 | | | 1 | | 1 | | | | |
| | | | | | | | | | | | | | | | | |
| 20 | | | 1 | 1 | | 1 | 1 | 1 | | 1 | | 1 | | | | 1 |
| 21 | | 1 | 1 | | 1 | 1 | | | 1 | 1 | | | | 1 | | |
| 22 | | 1 | | | | 1 | | 1 | 1 | | | | 1 | | | |
| 23 | 1 | | 1 | | | 1 | 1 | | 1 | 1 | 1 | | | | | |
| | | | | | | | | | | | | | | | | |
| 24 | | | 1 | 1 | 1 | | 1 | | 1 | 1 | | | | | | 1 |
| 25 | 1 | 1 | | | | 1 | 1 | | | | 1 | | | 1 | | |
| 26 | 1 | | 1 | | 1 | 1 | | | | | | 1 | | | | |
| 27 | 1 | | 1 | | 1 | 1 | | | 1 | | 1 | | | | | |
| | | | | | | | | | | | | | | | | |
| 28 | | 1 | | 1 | | 1 | 1 | | | 1 | | | | | | 1 |
| 29 | | 1 | 1 | | 1 | 1 | | 1 | 1 | 1 | 1 | | | 1 | | |
| 30 | | 1 | | 1 | | | 1 | | | 1 | | | 1 | | | |
| 31 | 1 | | 1 | | 1 | 1 | 1 | 1 | 1 | | | | 1 | | | |

Fig. 2E

|    | ECC 0 | ECC 1 | ECC 2 | ECC 3 | ECC 4 | ECC 5 | ECC 6 | ECC 7 | ECC 8 | ECC 9 | ECC 10 | ECC 11 |
|----|-------|-------|-------|-------|-------|-------|-------|-------|-------|-------|--------|--------|
| 0  | 1     |       |       |       | 1     |       | 1     |       |       |       |        | 1      |
| 1  | 1     |       | 1     |       | 1     |       |       |       |       | 1     |        |        |
| 2  |       | 1     |       | 1     | 1     |       |       |       |       | 1     |        |        |
| 3  | 1     |       | 1     | 1     |       | 1     |       | 1     | 1     |       |        |        |
| 4  |       |       | 1     | 1     | 1     |       | 1     |       |       |       |        | 1      |
| 5  |       | 1     | 1     |       |       | 1     |       |       |       | 1     |        |        |
| 6  |       | 1     |       | 1     | 1     |       |       |       | 1     |       |        |        |
| 7  | 1     |       |       | 1     |       | 1     | 1     |       | 1     |       |        |        |
| 8  | 1     | 1     |       |       | 1     | 1     |       |       |       |       |        | 1      |
| 9  |       | 1     | 1     | 1     |       | 1     | 1     | 1     |       | 1     |        |        |
| 10 |       |       | 1     | 1     |       | 1     | 1     |       |       | 1     |        |        |
| 11 | 1     | 1     |       | 1     | 1     | 1     |       | 1     | 1     |       |        |        |
| 12 | 1     | 1     |       | 1     |       |       | 1     | 1     |       |       |        | 1      |
| 13 |       |       |       | 1     | 1     |       |       |       |       | 1     |        |        |
| 14 | 1     |       |       | 1     |       |       | 1     |       | 1     |       |        |        |
| 15 |       | 1     | 1     |       | 1     | 1     |       |       | 1     |       |        |        |
| 16 |       |       | 1     | 1     |       | 1     | 1     |       |       |       |        | 1      |
| 17 | 1     |       |       |       |       | 1     | 1     |       |       | 1     |        |        |
| 18 |       |       | 1     |       | 1     |       |       |       | 1     |       |        |        |
| 19 | 1     | 1     |       | 1     |       | 1     | 1     |       | 1     |       |        |        |

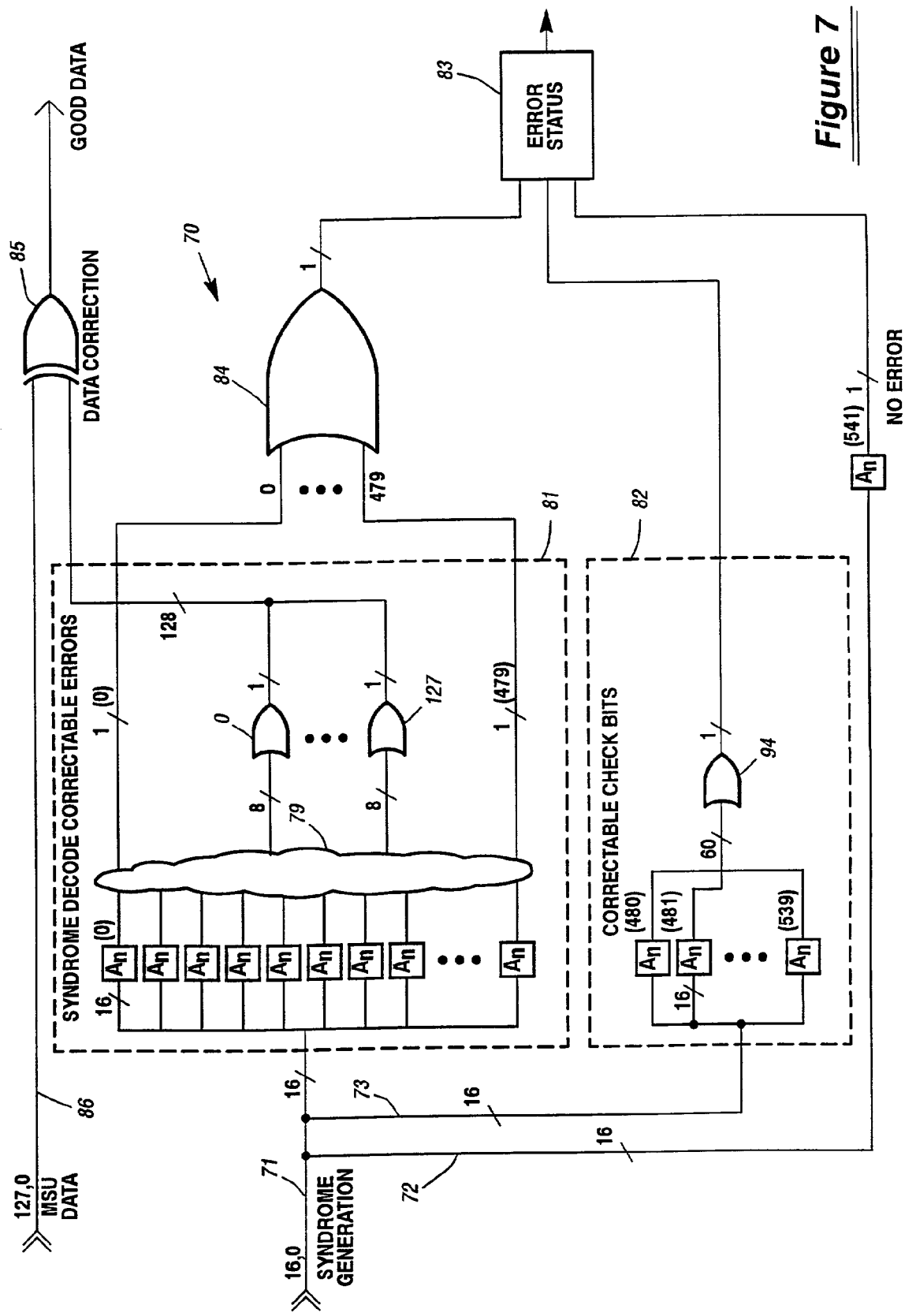

FAMILIAL CORRECTION WITH NON-FAMILIAL DOUBLE BIT ERROR DETECTION FOR DIRECTORY STORAGE

RELATED APPLICATIONS

This application is related to U.S. application Ser. No. 09/972,490 which has similar disclosure and to which this application adds new inventive features.

BACKGROUND OF THE INVENTION

1. Field of the Invention

This invention relates to correcting and detecting errors that may occur within a computer system particularly within a memory device, and more particularly to systems where a single bit correction supplemented with familial 1 through 4 bit correction and double bit word-wide detection are preferred, and even more particularly to directory storage using 20 bit data words stored in 4 bit RAM devices.

2. Background Information

It is expensive to dedicate memory to error correction code (ECC) space, therefore, compromises in the desire for perfect error correction and detection are needed. For sustainable commercial viability, one must still provide the largest computer systems particularly, and other RAM using data storage systems generally, with appropriate compromises in error detection and correction. Using some ECC to make memory subsystems more reliable by providing the capability to allow a single multi-bit RAM device to fail and dynamically correcting that failure and also providing the same capability for any 1, 2, 3, or 4 bits within a 4 bit RAM family and further providing for detection of any 2 bits of non-familial error anywhere in the word is the path we chose. This capacity will correct all single-bit and in-family 2, 3, or 4 bit errors on the fly, to produce a corrected data word, and identifies as unfixed (unfixable) and corrupted those data words with any other errors or error types. It is our belief that these are the most likely errors and that therefore our selected compromise is valuable.

As RAM device densities and memory subsystem bandwidth requirements increase over time, there was more pressure on the memory subsystem designers to use multi-data-bit RAM devices to meet their requirements. But to do so jeopardizes the reliability of the memory subsystem utilizing the standard Single Bit Correction/Double Bit Detection (SBC/DBD) of the past. As RAM device geometries become smaller and device failure rates increases, data words become more susceptible to failures that affect more than one bit in the device. Also, even though single bit errors are still the most predominant failure mode of RAM devices, soft single-bit failure rates are increasing do to the shrinking of the geometries and reliability characteristics of these devices. So it becomes more important to at least detect double bit errors from multiple devices, so that data corruption can be detected and safely handled. This invention provides for that protection. Providing enhanced error detection and enhanced error correction without substantial cost increases, due to increased ratio of redundant Error Correction Code (ECC) bits versus information data bits are additional goals of this invention.

There were two main methods of handling error correction and detection in the past. The predominant one was to create multiple SBC/DBD fields across the data word, and have each bit of the RAM go to separate SBC/DBD fields. The issue with this method is the additional costs of the RAMs to support the extra check bits. For example, if you had a 128-bit data word that needed protection and this 128-bit data word was implemented using x4 RAM devices it would take 4 groups of 8 check bits to provide the same fault coverage as the proposed invention. These check bits would be implemented in (8) x4 RAM devices. Our invention only needs 16 check bits or 4 RAM devices, rather than the 32 when using x4 devices. For very large memories, the extra cost of that extra RAM is significant if not commercially prohibitive. Because we developed this code for 128 bit memories we find that it can also be used for 20 bit memories having only 5 RAM x4 devices, without any modification using only a limited portion of the code. Because our directory store memory is of that size, we can apply it to directory storage correction and error detection as well.

Another method is to use 2 ECC fields with each ECC field providing 2-bit "adjacency" correction. (The word "adjacency" in this art means within the family of bits (that is, of the bits) within a given RAM device, not necessarily bits which are "next-to" each other). This method would also need 4 RAM devices to implement the 2 groups of 8 check bits, and therefore would have the same cost. However, within each of the ECC fields, not all two-bit errors across multiple devices are detected. Therefore the cost is the same, but it doesn't have the same reliability characteristics.

The multi-bit adjacent error correction or Chip Kill is merged with double bit nonadjacent error detection. This entails the ability to detect and correct failures within a single RAM device, and to further detect failures that have resulted from soft or hard errors of any single bit in any two RAM devices within the 128-bit word. No other solution has ever achieved this. A unique ECC table is used in our invention in conjunction with a specific RAM error definition table (for syndrome decode), neither of which are in the prior art.

Prior inventions did not allow for the level of reliability that is present with an error code correction feature which combines single bit error correction and multi-bit adjacent correction with double bit non-adjacent error detection, at least not with a small number of additional ECC-type bits. (ECC means Error Correcting Code and is a common abbreviation in this art).

Thus, there is a need for error correction and detection at low memory cost and high reliability, and providing familial error correction allows for capturing the most likely to occur of the multi-bit within a word errors, those that occur within a single DRAM or RAM device. Accordingly, by thinking of the problem in this way, instead of trying to correct every possible error, we have designed an inventive and low cost error detection and correction system as set forth below.

There have been similar systems in the art, but these do not have all the advantages or requirements of our invention. Perhaps the closest reference in a U.S. Pat. No. 6,018,817 issued to Chen et al., and incorporated herein by this reference in its entirety. Using same sized (x4 bit) RAM devices, the Chen '817 reference requires 12 ECC bits for each 72 data bits if a 4-bit-wide RAM is used, while our invention handles sufficient reliability needs with only 16 bits of ECC for 128 data bits using 4-bit-wide RAMS. (RAM is the generic term, which includes DRAM, and while our preferred implementation was developed on DRAM chips, other RAM devices can be used). Further, Chen '817 requires 16 ECC bits per 72 data bits if they use x8 RAM devices. Compared to either embodiment of Chen '817, our invention seems to produce more error checking and also possibly more error correction while requiring less ECC bits.

The specific code to support the 12 ECC bit code appears to be described in U.S. Pat. No. 5,757,823, Chen '823, (also incorporated herein by this reference). The cost savings related to an additional third of savings over Chen '823 will be appreciated by those of experience in these arts. As Chen mentioned in Col 1 lines 40–52 that even a 5% savings in memory commitment for main memory is very important to computer systems.

An additional patent of interest includes Blake et al, U.S. Pat. No. 5,682,394 which shows a disablement feature, and this is also incorporated herein by this reference.

Finally, Adboo et al., U.S. Pat. No. 5,490,155, also incorporated herein by this reference, describes a system for correcting ×4 DRAM errors. Adboo, as in our invention, uses 16 check bits for a 128-bit data word. However Adboo requires that the check bits be produced by two identical parity trees for each 64 bits, wherein each parity tree has the same number of inputs, and the outputs are paired to correct up to four bit errors within a single DRAM or RAM device. Perhaps more importantly, Adboo can only detect and correct one single bit error in a word or one two adjacent-bit errors in a word, or four adjacent bit errors in a word. Adboo cannot detect two unrelated single bit errors or a single bit error outside of a familial group having up to 4 bit errors, which our invention can do. As can be clearly seen with reference to Adboo's FIG. 9A, an error in two check bits (or many of the two bits unrelated errors, actually) that are unrelated or non-adjacent, yields an uncorrectable and undetectable error. For an example of this failing of Adboo, not that the code for bit C4 is 0001 and the code for C7 is 1000. XORing these two values leads to the result 1001, which indicates that bit 0 is in error. Thus if both C4 and C7 are in error, the syndrome will indicate that bit 0 is in error, an unacceptable situation, even if such an occurrence may be a rare event, because it missed two single bit errors.

Accordingly there is a need for stronger detection and correction of errors to improve the reliability of computer system memories and to do so with a minimal amount of data. An error correction system and chip-kill type system together with double bit non-familial error detection will provide a commercially most useful solution to this technical problem.

I have also discovered that a subset of the inventive code may be applied to protect the directory storage in a computer system, using the features described herein, such that with only 12 ECC bits I can achieve the same benefits described for the 128 bit memory using the inventive code applied to the 20 bits used for the directory storage devices in our computer systems. Reliability, consistency, and ease of design and manufacturability are all enhanced by using the same ECC for the directory store as for the main memory.

Accordingly, for directory store we use a separate but in many ways identical ECC pathway and system as the one we use for the main memory data store.

We describe our invention with reference to the drawings in the summary and detailed description sections below, but limit its scope only by the appended claims.

BRIEF DESCRIPTION OF THE DRAWINGS

FIG. 1 is preferred embodiment table of binary values defining the possible error states and the four bit codes for them for each RAM device in the word.

FIGS. 2A, 2B, 2C, and 2D (hereinafter referred to together as FIGS. 2A–D) form a table of error correction code binary values in accord with a preferred embodiment of the invention.

FIG. 2E is a table with only a portion of the code illustrated in FIG. 2A.

FIGS. 3A, 3B and 3C (hereinafter referred to together as FIGS. 3A–C) form a table of values identifying correctable bits in accord with the preferred embodiment of the invention using the ECC values of FIGS. 2A–D and the possible error state table of FIG. 1.

FIG. 6B and FIG. 6A are mathematically equivalent.

FIG. 7 is a block diagram illustrating the syndrome decode function in accord with a preferred embodiment of the invention, and also illustrating the generation of the error status bit, also in accord with a preferred embodiment of the invention.

SUMMARY OF THE INVENTION

Figure 4:
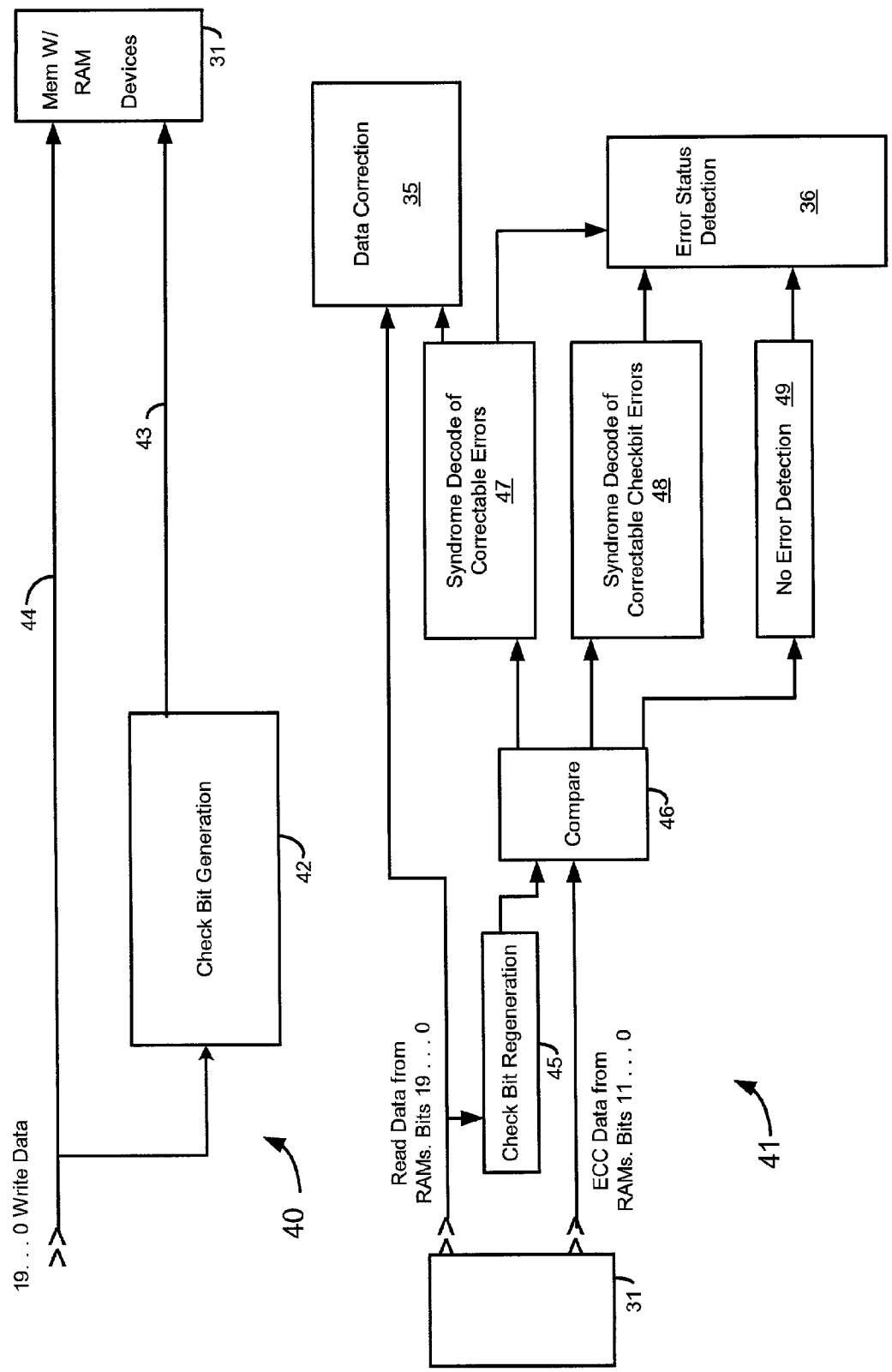
FIG. 4 is an ECC block diagram illustrating the flow of processes in accord with the preferred embodiments.

A highly complex code sequence has been discovered which provides an opportunity to correct multi-bit errors within a bit family, while at the same time providing an opportunity to also detect all additional single bit errors outside of that bit family, and further providing an opportunity to detect many other multi-bit uncorrectable errors.

This code requires only 16 "check" or ECC bits that are generated through the use of the inventive code for 128 bit data words, by feeding each indicated one of the 128 bits into each XOR tree of the 16 check bits indicated by the code. The same generator (or an identical one organized by the same code) regenerates the 16 check bits when a 128-bit memory word is read out of main memory and a comparison with the originally generated check bits is made by XORing the saved check bits with the output of the regenerator to produce a syndrome code. (This is the same, mathematically, as putting the 128 data bits through the same XOR tree configuration and adding in the check bit for each branch of the tree, which in practice is how we prefer to produce the syndrome because less cycle time is required). The resulting syndrome is decoded, again employing the code sequence to organize the decode gates, to identify all the correctable errors (540 of them) and to identify most conditions of uncorrectable errors, and to indicate good data if there is no detectable error or corrupted data if errors are detected but they are uncorrectable.

The code sequence can be modified by shifting bits' ECC values to other bits, so long as the ECC generator and regenerator/syndrome generator are both corrected to match the code change, and the syndrome decode is modified to compensate for the shift as well.

It has also been discovered that by using only a portion of the same code, the same degree of protection against errors may be given to the directory storage memory systems of computer systems which have parallel directory storage memory systems. These can function in parallel using the same timing, and the same logical structures as the main memories by use of this invention. The fact that the code has a large section of all zeros provides that if we use that section we can reproduce the functional equivalent of the code using only 12 ECC bits for the limited 20 data bits required for directory storage.

DETAILED DESCRIPTION OF THE PREFERRED EMBODIMENTS

The preferred component concepts and parts are described first, and then the preferred functioning of the invention is described. The accommodation of the invention to directory store data is explained throughout.

Please refer first to FIG. 1 in which the RAM error definition table 10 is illustrated, having five columns, the first four of which (R) indicate the DRAM or RAM bit number for each RAM under consideration. These four bits are said to be family bits or familial, because they are within a single RAM device. In some texts this is referred to as "adjacency," but we find that term confusing since the last bit in one RAM might also be considered adjacent to the first bit in the next RAM. So, for purposes of discussion within this patent, we say that all bits within a DRAM or RAM device with be considered familial bits and those outside are not familial or are not part of the same family. We label the rows 0–16 of FIGS. 1's table 10 for later reference.

Table 10 describes all possible error states (there are sixteen, including no error) in area S for each of the family of bits in RAM X, a four-bit RAM or ×4 RAM device. (In a 128 bit word there are 32 such devices. RAMs 0–31, and in our preferred inventive system, there would be an additional 4 devices, making 36 such RAM X devices in total per 128-bit-data-plus-16-bit-ECC word). The column ETC indicates the error type code for each error type. Thus, an S3 indicates an error in bit 3 of RAM X, with no other errors in the family. A D2 indicates one possible two-bit, in-family error state with bits 2 and 1 of RAM X being in error. A T indicates one of the four possible three-bit in-family error states for RAM X, and the Q (Q0) indicates that all four bits are in error.

Note that the arrangement of 1's in the table 10 is arbitrary and that one of ordinary skill in this art will be able to place the fifteen 1's in other locations so that a unique table identifying all possible errors but having them in different locations would result. Any such table could be substituted for this preferred table of FIG. 1, if desired, without leaving the ambit of this invention. For example, the diagonal of 1's in the first four rows could be reversed so that column 0, row 0 has a 1, column 1, row 1 has a 1, column 2, row 2 has a 1 and row 3, column 3 as a 1, and the remainder of the table could remain the same, thus producing another possible variation of the inventions, as will be fully understood with reference to the remainder of this disclosure. This table is for consideration when assessing each family of bits (i.e. each 4-bit RAM device).

Note also that in the directory store we also use four bit-wide RAM devices so the same table is used for the directory store embodiment, with the same limitations and flexibilities.

Figure 2A:
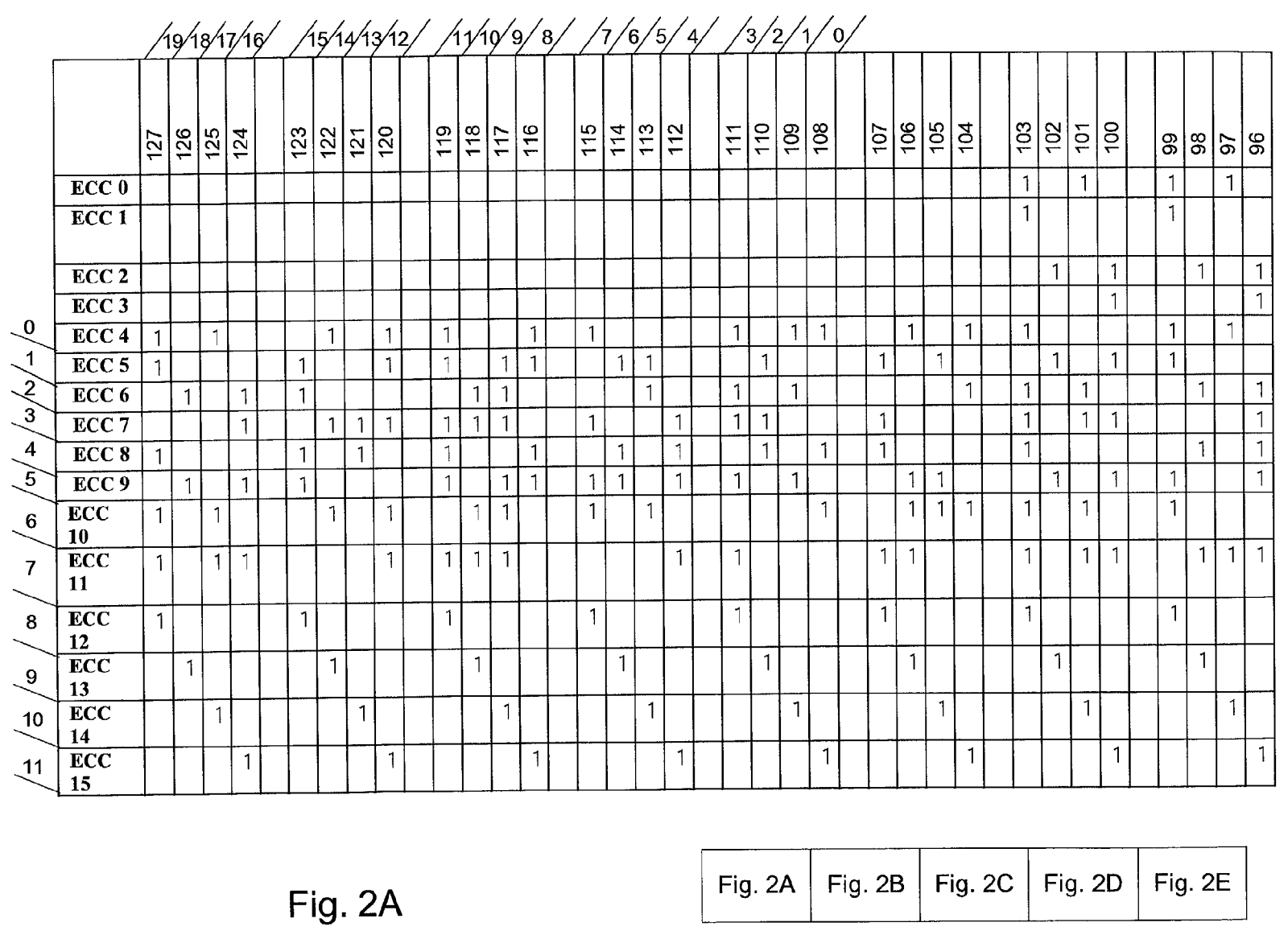

Spanning FIG. 2A and FIG. 2B there is a single ECC table 20, specifying each of the signal states of bits ECC0–15 for each bit 0–127. As mentioned in the Summary section, one could modify this invention by shifting a family of bits to another location, or shifting many of the families to different locations and, if one shifted the other components of the invention with reference to the code specified by this shifted table, one could reproduce the invention in another form. What is meant by that is that if for example, the family of bits 127–124 were to have their ECC table (rows ECC 0–15 for each column 127–124) shifted to be under bits 72–75 were shifted to replace the ECC bits under 124–127, the invention would still work. The code discovered is not, therefore, unique to the representation in FIGS. 2A–D, but the set of 32 family bit code patterns should be reproduced faithfully to produce a 128 bit by 16 bit code in order to expect the invention to function as described in detail here within.

Note that on FIG. 2A a second set of orienting column and row numerals is employed, external to the ones just mentioned. (These numerals are rows 0–11 equivalent to ECC4–ECC15, respectively; and columns 19–0, equivalent to columns 127–108, respectively.) These additional reference numerals are useful for illustrating the part of the table used for the directory store memory error detection and correction functions in the directory store embodiments.

Figure 3A:
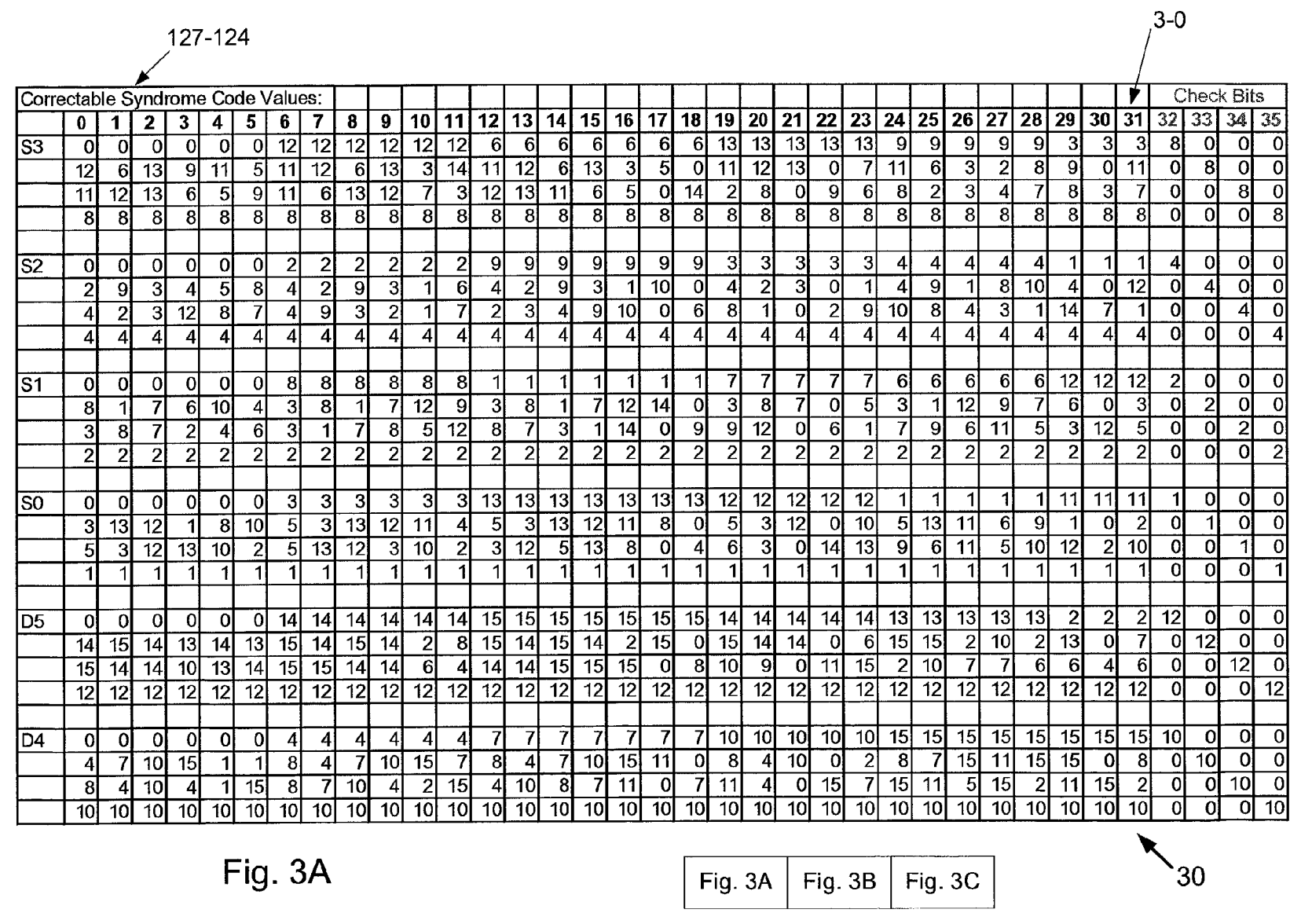
Figure 3B:
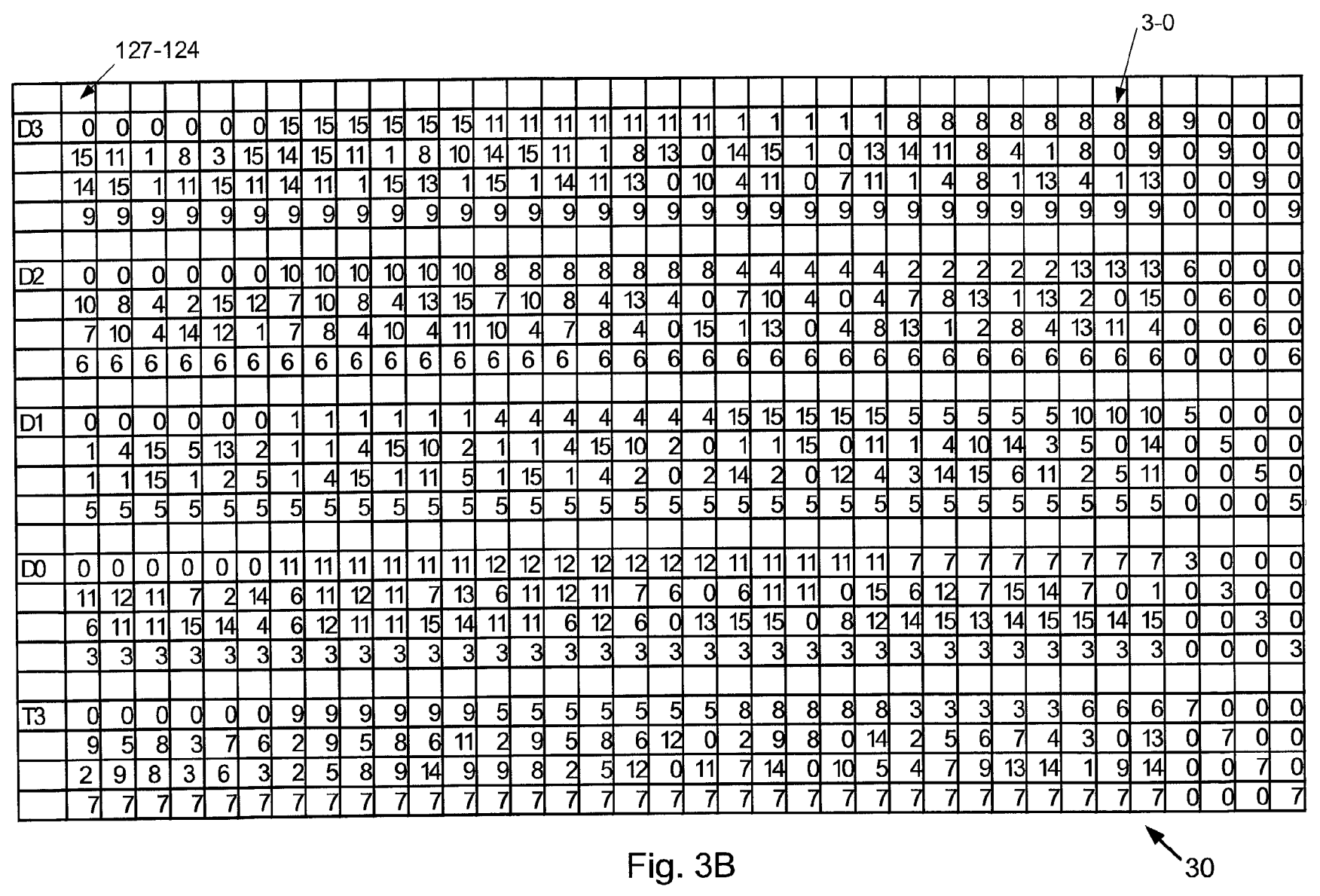
Figure 3C:
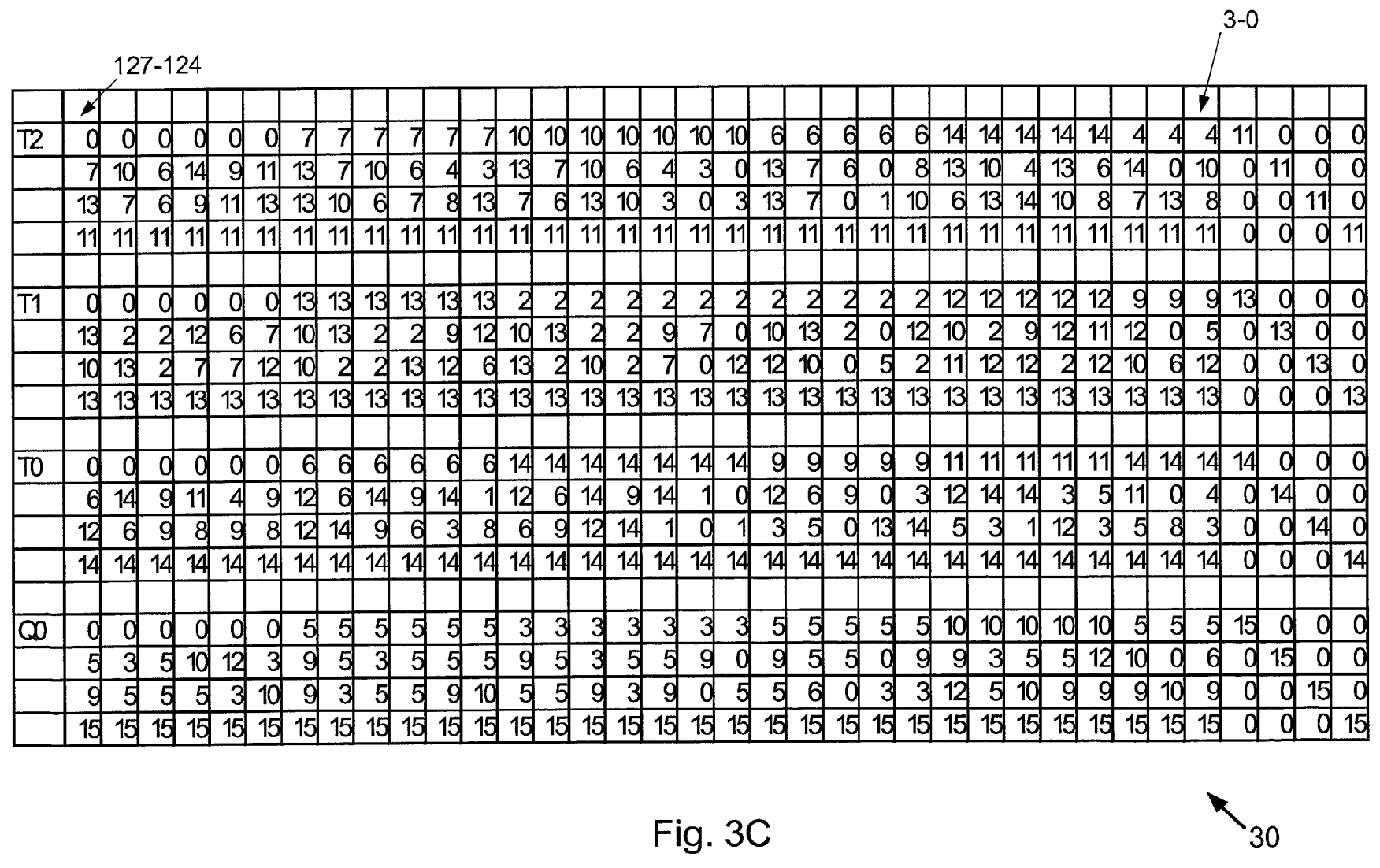

FIGS. 3A–C is a table of the correctable syndrome codes, specified in hex but printed in decimal form, so that for example, a 12 (shown in the table 30) is equivalent to $C_{hex}$ or $1100_2$. Thus each number in the table specifies 4 bits of the syndrome code needed to indicate a particular error within a family. There are 36 families (0–35) since there are 4 families for the check bits (32–35). The 15 possible error codes are specified in the left-most column and the family (DRAM number) is specified along the top. Thus a syndrome code of 0,9,2,7 indicates a T3 error in family 0 (RAM 0), meaning, with reference to FIG. 1, that bits 0, 1, and 2 are in error. This table thus specifies the 540 correctable errors the preferred embodiment of the invention can handle and how they are based on the syndrome generated in accord with the preferred form of the invention. (Note that the family (or column) designated "0" corresponds to bits 127–124 of the data word). A subset of this table is relevant to the directory store embodiment as well, as one of ordinary skill in this art will understand.

FIG. 4 illustrates the data flow in two related diagram parts 40 and 41. Diagram 40 shows the path of data into the DRAM or RAM device 31, in which 16 check bits are generated in block 42, and both the check bits and the original 128 bits of data are sent to the memory device on lines 43, and 44, respectively. Retrieving the word after being stored in memory involves check bit regeneration and comparison 45, 46, and based on the syndrome produced, decoding for correctible errors in the data word and the check bits, 47, 48, along with production of a tentative no-error signal 49. The 128-bit data word is corrected (if it can be) in data correction block 35 (where one of the 540 syndrome codes is produced to specify which bits need to be corrected). Also, error status detection is performed in block 36, generating an indicator signal showing that there was an error, and whether it was correctable (and corrected) or uncorrectable. The syndrome can be reported out to indicate which bits are bad if desired.

Figure 11:
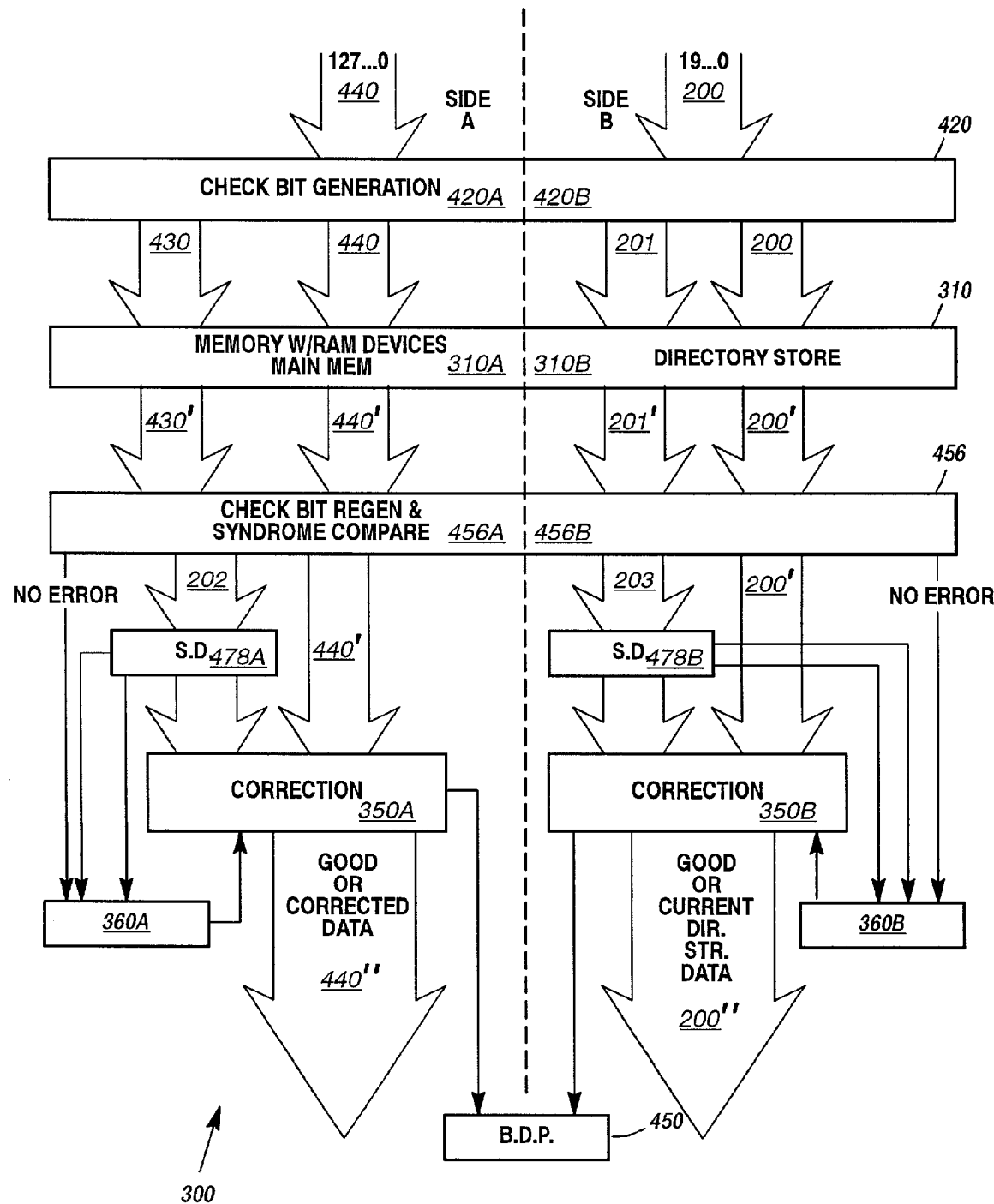
FIG. 11 is a block diagram illustrating the relationship of the main storage memory devices and the directory storage memory devices as related to the application of the preferred embodiment invention herein described.

FIG. 11 shows two units equivalent to FIG. 4, one for the main memory store as illustrated in FIG. 4 and one for the directory store, functioning in parallel. Thus the data from line 440 generates a set of check bits 430 in parallel (and on side "A") to the memory directory store creating its check bits on line 201 from input line 200 (on side "B"). The sizes of the lines for the data on sides A and B are of course different, to accommodate the different sizes of the memories needed/used. Also, the check-bit generation and regeneration/syndrome generation circuits will vary in that the ones for the directory store are pared down in a way described in more detail below.

FIGS. 5–8 illustrate in more detail this process provided in overview from FIG. 4.

The Main Memory Embodiments

The preferred embodiment works with memory that uses two standard 72-bit DIMMs. (DIMMs are common parlance for Dual In-line Memory Modules, a common form of memory sold today, most commonly having thirty-six ×4 DRAMs per DIMM unit). These common DIMMs provides straightforward implementation for having a 144-bit word where there are 128 data bits and 16 check bits. Utilizing standard DIMMs reduces the cost of the system greatly, adding to the value of this invention. Under this two DIMM organization 16 check bits are generated for every 128-bit word that is sent into the memory. Check bits are the calculated odd parity across a specific pattern of RAM bits. After the 16 check bits are generated, using the error correction code table in the table 20 of FIGS. 2A–D, they are stored in memory. Table 20 shows the inventive ECC code that is used in the form described by the preferred embodiment. The 16 check bits associated with each word are generated by calculating odd parity across the "1's" set in each ECC row for each data bit [127:0]. (Thus the "table" is actually implemented in a parity tree.)

When retrieving data words the process of generating check bits is repeated with a twist.

Check bit regeneration occurs using Read data bits [127:0] from the RAMs. These regenerated check bits are compared bit-for-bit to the stored check bits, bits [143:128] from the RAMs. The comparison, using an XOR function results in a 16-bit syndrome code. A determination is made of which bits or family of bits in the 128-bit data-word may be in correctable error when the syndrome code is decoded.

Figure 5:
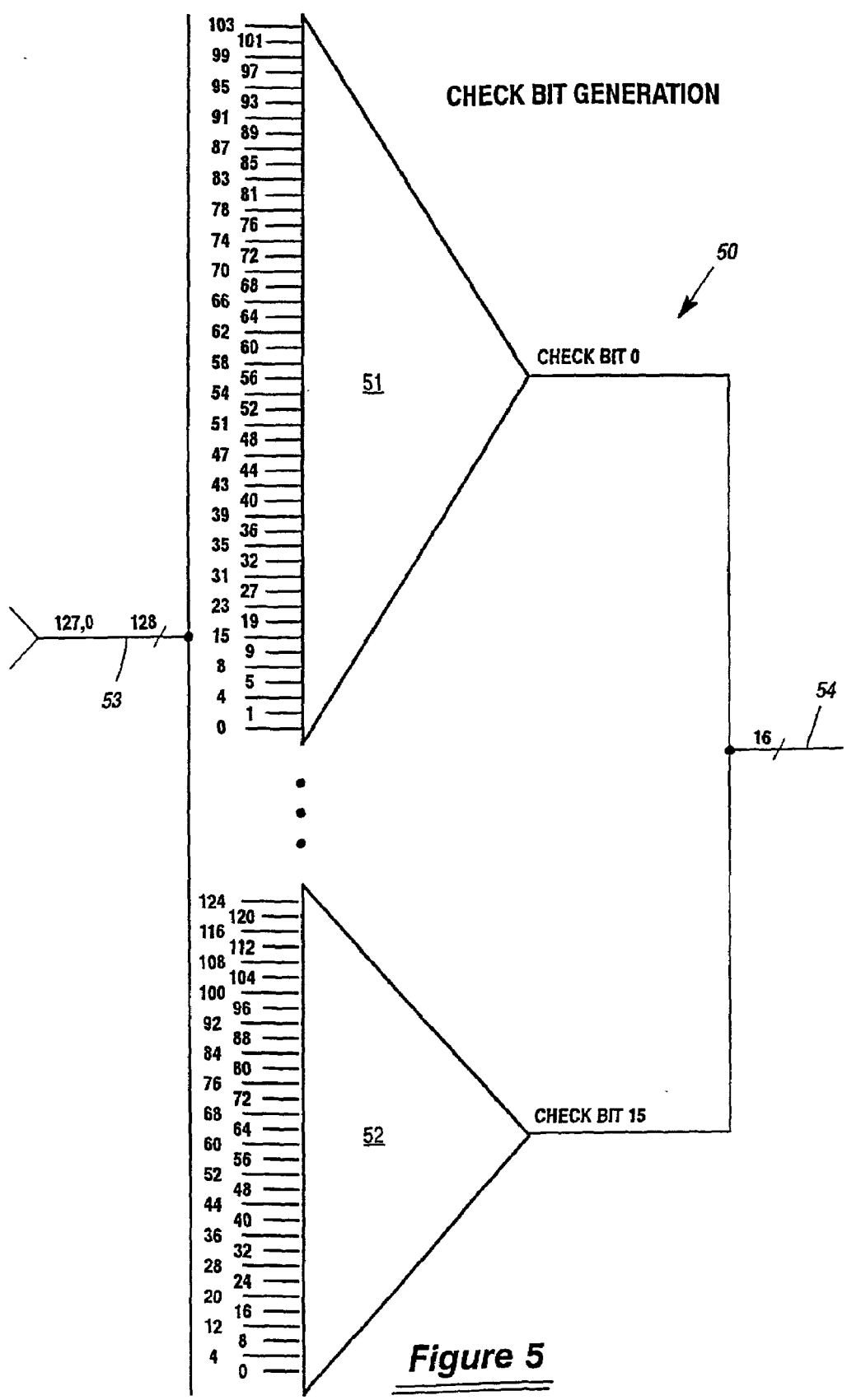
FIG. 5 is a block diagram illustrating two branches of a parity tree in accord with the preferred embodiment of the invention, organized in accord with the table of error correction codes of FIGS. 2A–D. The invention employs 16 such branches in any embodiment as described herein to generate the 16 check bits for a 128-bit word.

Refer now to FIG. 5, and note that write data consisting of a 128 bit word which is to be written to memory is used to generate 16 check bits via an odd parity tree 50 in accord with the prescribed connections based on the values in the ECC table of FIGS. 2A–D. Thus, for the first XOR gate branch 51 for the tree 50, bits 0, 1, 4, 8, and so on, to bit 103 of the 128 bit data word, as specified by the top line of FIG. 2A-D, are fed into the XOR gate 51 to produce an output for the first check bit (ECC) of the 16 check bits. A branch is constructed in this manner for each bit of the 16 ECC bits. For heuristic purposes only branches comprising XOR gates 51 and 52 that produce check bits 0 and 15, respectively, are illustrated. Thus, from an input line 53 of 128 bits (0–127), 16 output bits are produced on line 54. This accomplishes the function of block 42 of FIG. 4, and the data and the generated check bits which correspond to the data through the code of FIG. 2A-D's table are now prepared to be written to memory. (As mentioned previously, the code word of FIGS. 2A–D could be modified by shifting families of code around, while still being within the scope of this invention. For this check generation module, such shifting to produce a code of the same effect but different form than the one of the preferred embodiment would be reflected in a changed distribution of the inputs to the 16 branches of the tree corresponding to the swapped values of the code). In all events, the check bit code after being generated, should be stored in RAM memory devices related to the ones used for storing this particular memory data word, thus requiring 128 plus 16 bits per word for storage. Due to the family restrictions, it is preferable to store the bits into ×4 DRAMs as indicated by the syndrome decode chart of FIG. 3. Thus, bits 127→0 into DRAMs 0→31, by 4's. Also, the 16 ECC bits should be stored into DRAMs 32–35.

When one wants to retrieve the word from the memory, the process employs the pieces described with reference to FIGS. 6A, 6B, 7 and 8, in accord with the preferred embodiments of this invention.

Figure 6A:
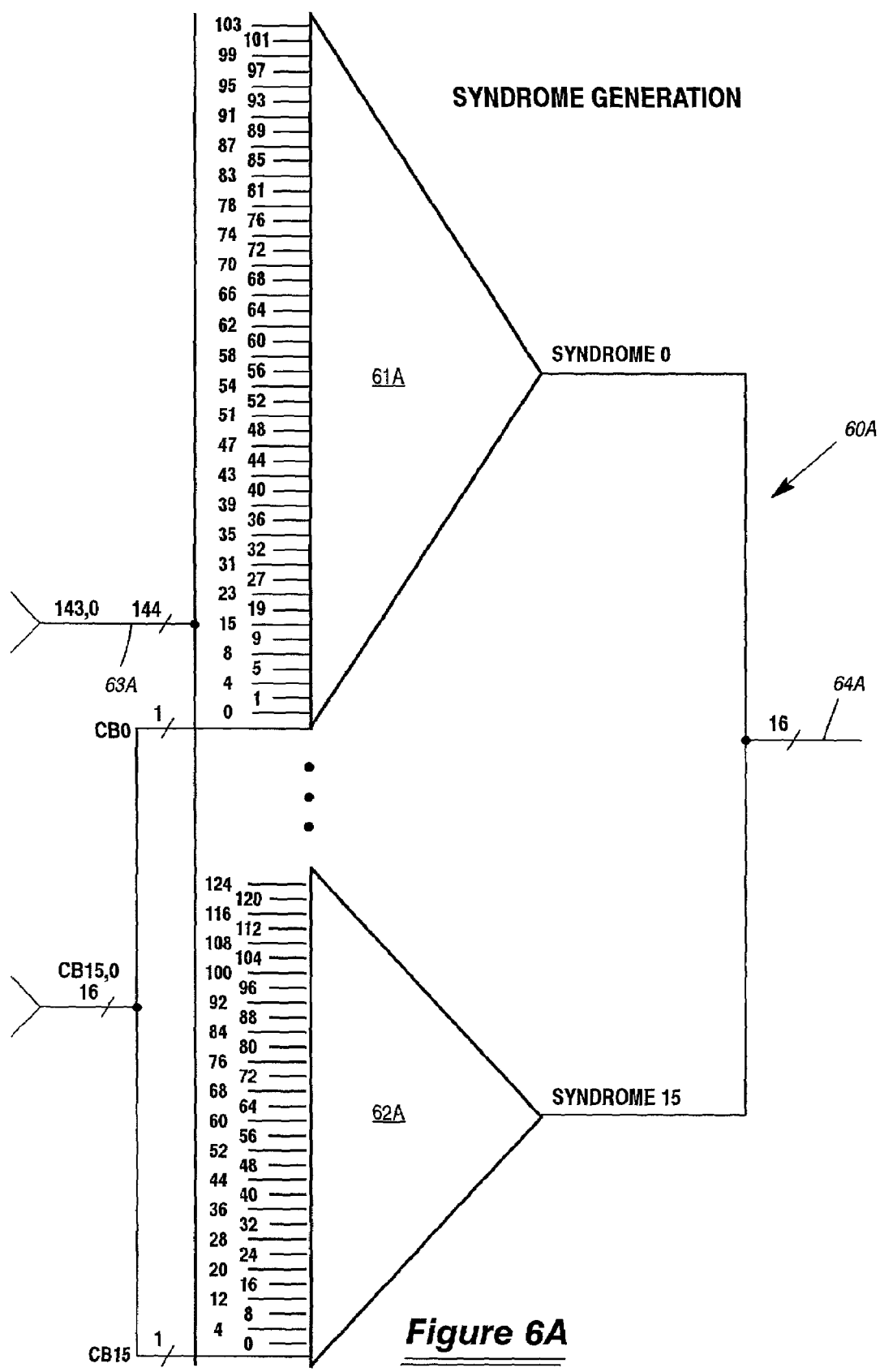
FIGS. 6A and 6B are also block diagrams illustrating two branches of a parity tree in accord with the preferred embodiment of this invention. The invention employs 16 such branches to generate the 16 syndrome code bits employed as described further herein.
Figure 6B:
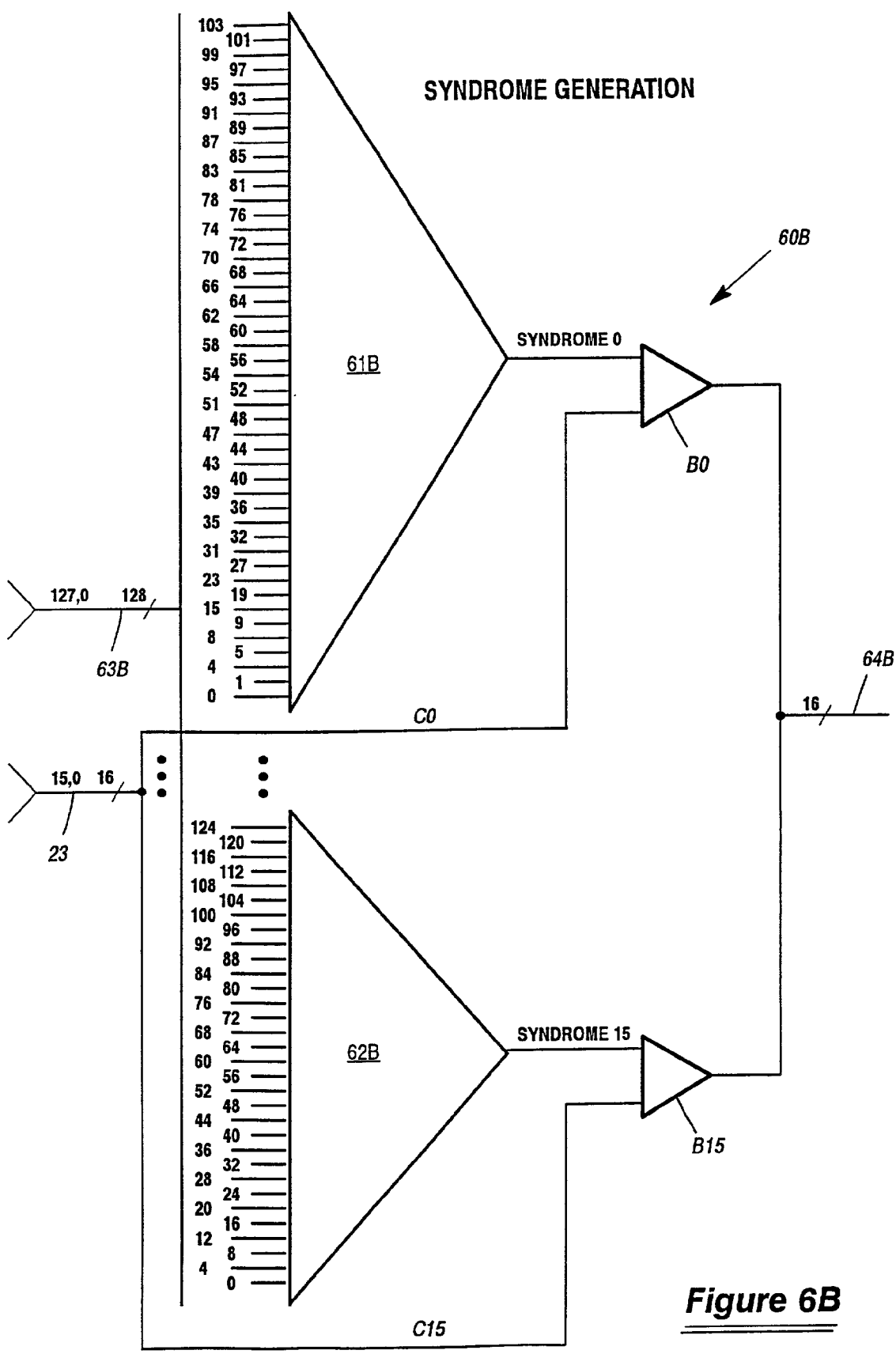

We illustrate alternate embodiments in FIGS. 6A and 6B. In 6A, the processing may be faster since all the codes go through a single XOR branch for each syndrome bit, while in FIG. 6B, we add an XOR gate for each branch to accommodate the stored check bits separately. Mathematically these are the same but the variation of FIG. 6A should be faster due to less gate delay. Again, as in FIG. 5, the 128 input lines (here from the memory devices coming in on line 63A or 63B are dispersed to the 16 branches of an XOR tree to produce 16 bits. In FIG. 6A, in each one of these branches an additional input is taken from the memory, employing the stored check bits, dispersed C0–C15, to the branches 0–15, respectively. In FIG. 6B, the XOR tree branch has an additional root through an XOR which XOR's the result of the XOR of the assigned ones of the 128 bits from each branch 61B–62B with the ECC stored code bits C0–C15, through XOR gates B0–B15, respectively. Either way, there is a 16-line output line 64A, 64B that now contains the syndrome code for this data word and check bit code as output.

Thus, as illustrated in FIGS. 6A and 6B, check bits are read from the RAMs and XORed with the 16 bits generated from the same 128 bit data word via a parity tree as above in accord with the inventive ECC table of FIGS. 2A–D to generate a syndrome code of 16 bits. Again, if the reader is considering using the basic ideas herein with a shifted table; if the table of FIGS. 2A and 2B is shifted, the input lines to the 16 branches should be shifted in accord with the table shift.

Recall the earlier discussion indicating that these syndrome codes are graphically represented in tables 2a and 2b showing either a 1 or 0 for each 16-bits available to the syndrome code for each of the 128 bits in the data word. The table of FIGS. 3A–C represents the 540 correctable errors by showing the syndrome code values representative of each type of error for each RAM device. The syndrome code is a set of 4 numbers displayed in a decimal form of hex.

Figure 9A:
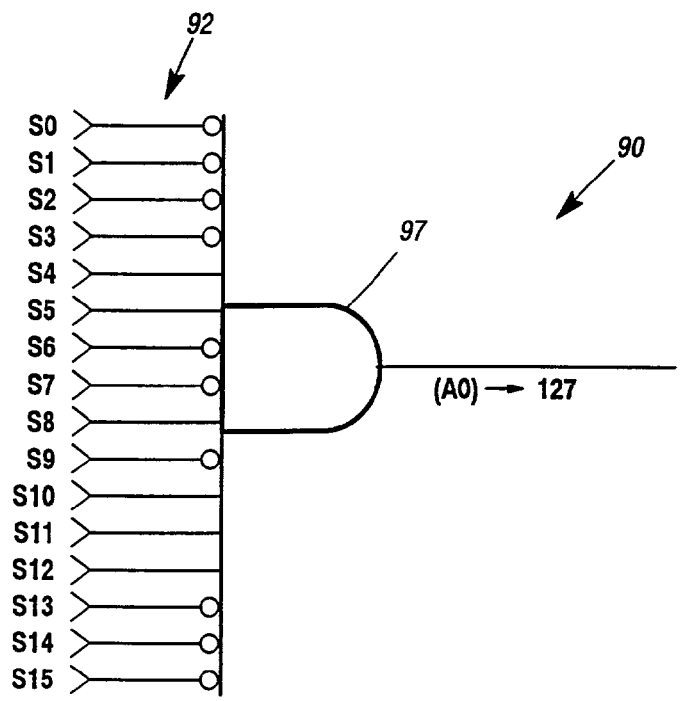
FIGS. 9A and 9B are block diagrams illustrating an AND gate and an input arrangement of syndrome lines to it for the circuit of FIG. 7, and is best considered with reference to a subpart of FIG. 7, illustrated in FIG. 10.
Figure 9B:
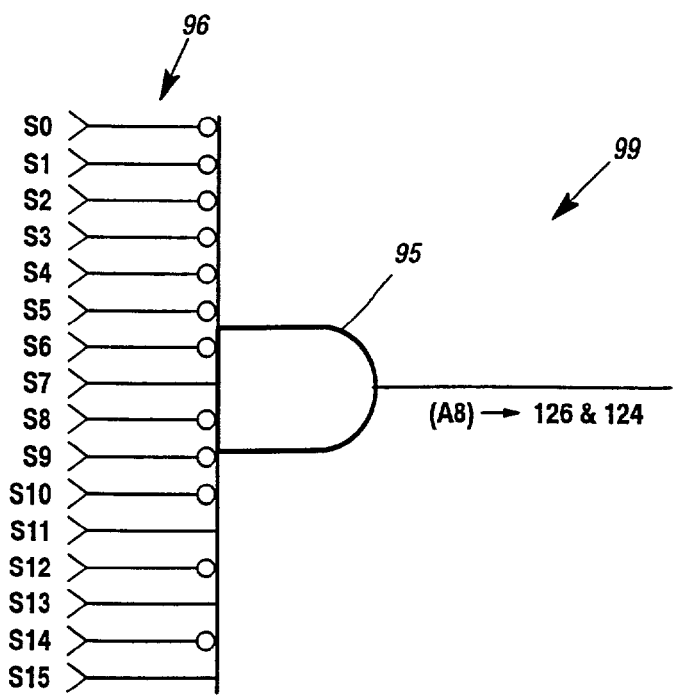
Figure 10:
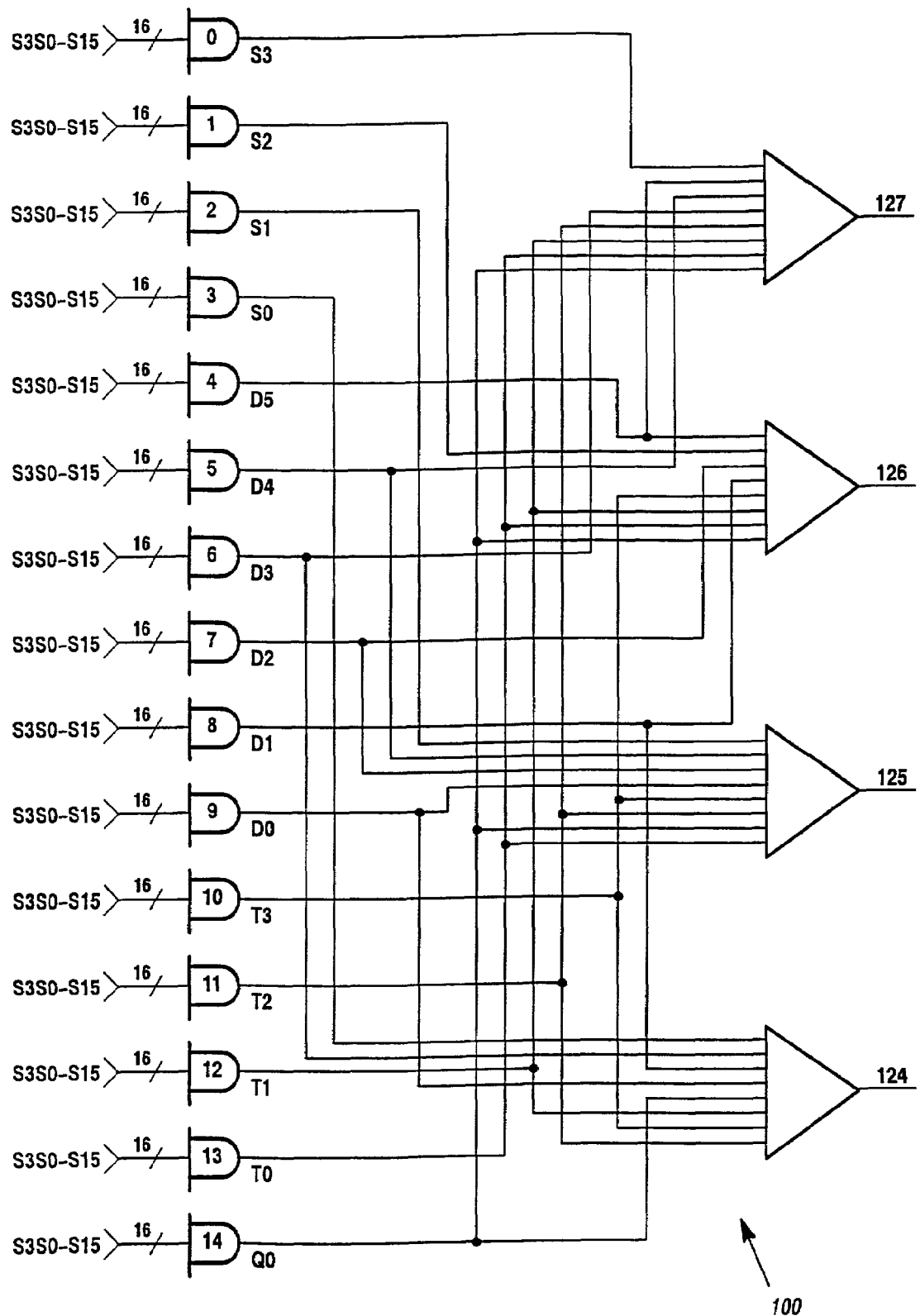
FIG. 10 is a subpart of the circuit of FIG. 7, containing a set of four XOR gates each receiving input from eight of the AND gates of FIG. 9.

The syndrome codes are decoded through a complexity of AND gates, as illustrated in an abbreviated manner which is understandable by those of ordinary skill in this art in FIG. 7, with reference also to FIGS. 9A, 9B, and 10. These illustrations fit together as follows. The AND gates of FIGS. 9A and 9B (91 and 95, respectively) illustrate the same general construction for AND gates An (0–539) of FIG. 7 and AND gates 0–15 of FIG. 10. The AND gates 0–14 of FIG. 10 have identical inputs to those illustrated for gate 91 of FIG. 9A but the inputs are inverted in accord with the code section relevant to that particular bit as determined by the inventive code (and described in more detail just below for two such AND gates as examples). These AND gates and are the same as AND gates An of FIG. 7. Each subsequent group of AND gates serving each next set of four OR gates is grouped in a pattern similar to that illustrated in FIG. 10 for ANDs 0–14, so that eight error outputs can feed each of them in accord with the FIG. 1 arrangement of possible errors (eight for each of the four bits in the family). The inputs are inverted in accord with the code for that family as set out in FIGS. 2A–D. The reason for this abbreviated illustration will become apparent as we describe the function in greater detail.

Recall that there are 15 possible error types for each family of four bits and one no-error condition as illustrated in Table 10. It should be noted that since the 15$^{th}$ ECC value will always be zero inputs, that is, when all the bits are good in a family there will be no error value, there actually need only be 15 AND gates to handle the syndrome decode for the 128-bit word.

While it would be possible to compute that signal value of the syndrome and compare it to a look-up table, a faster way to get at the particular error found in the syndrome so that it can be used to correct the error, is to provide a set of 16 syndrome bits to 15 AND gates for each family of bits, simultaneously. FIG. 10 illustrates how four OR gates are set up with eight inputs each from the 15 AND gates. Before discussing FIG. 10, please refer to FIG. 9, the first such AND gate 90, which would provide input to correct bit 127. Note that a negative or inverted input is provided for syndrome bits 0, 1,2, 3, 6, 7, 9, and 13–15. This corresponds with the bit pattern of zeroes for bit 127 of the chart of FIGS. 2A–D. The table of FIGS. 3A–C could also be used, which is a transposition of the FIG. 2A-D table and some modula2 results for each of the 15 possible error states for each of the families in the word plus the word's checkbits. This AND gate 90 input arrangement is unique to OR gate 127, as can be seen from FIG. 10, wherein the only output from gate0 (the same as Gate 90 of FIG. 9A) goes to gate 127. The AND gate 99 of FIG. 9B has a different arrangement, corresponding to D1 results under column 0 of Table 3. Thus the decimal values for D1, (0, 1, 1, and 5) translate into the binary pattern: 0,0,0,0:0,0,0,1:0,0,0,1:0,1,0,1, which is repeated in the inverter sequence on the inputs to gate 99 of FIG. 9B. To get the double bit error values one XORs the values of the two relevant bits from the table of FIGS. 2A-D. Thus, the relevant bits, 0,2, (from table 1 which could be in error for a D1 error) correspond to bits 126 and 124, which gives us two binary patterns of ECC bits: 0,0,0,0,0, 0,1,0,0,1,0,0,0,1,0,1 and 0,0,0,0,0,0,0,1,1,0,1,0,0,0,1, respectively. XOR-ing these (modula2 adding these) yields the binary pattern 0,0,0,0,:0,0,0,1:0,0,0,1:0,1,0,1, the pattern applied to the inputs to AND gate 99. All the AND gates are figured similarly for the entire 480 correctable errors in the preferred embodiment as illustrated in FIG. 7. We also do the same thing with the correctable error bits for the check bits, but there we simply feed the output into a single sixty input OR gate 94, because we are only interested in knowing if there was an error that we could correct within the check bits.

If desired, any error found could be sent to a maintenance processor, and if one does that one might want to continue the pattern of applying each 16 AND gate set to the four families of check bits as inputs to 4 OR gates to determine the family with the errors. However, how the maintenance and replacement functions are performed are beyond the scope of this invention, so it is sufficient to note that we could provide output indicating which family is having errors to indicate a maintenance/replacement problem to a user of the system.

The 541$^{st}$ AND gate (541, FIG. 7) has all inverted inputs, and if the syndrome is all zeros, a "No Error" output is produced therefrom.

So to reiterate how the AND gate function works, refer again to FIG. 9A. There are eight possible syndromes using this combination that could indicate an error in bit 127. These are found in FIG. 1: they are bits 0, 4, 5, 6, and 11–14 of the table 10 chart. Therefore, if any bit in the syndrome is not a 1 value for all the input bits to AND gate 90 that are not inverted, or if any of the bits in the syndrome are not a 0 value for inverted input bits to the AND gate 90, it will cause a 1 output and flip the value of the OR gate, indicating an error for bit 127. In this way, for bit 127 (and similarly for all the other 127 bits of the data word), one 16-AND gate set will produce any positive outputs in a single clock-cycle, indicating that the OR gate it feeds will go to a high output (a 1) and that bit corresponding to that OR gate will need to be flipped or corrected.

In FIG. 7's diagram 70, the over all set up is illustrated. Here, the syndrome input line 71 provides the syndrome's 16-bit input to blocks 81 (testing the data word of 128 bits of correctable error), and via line 73 to block 82 (testing the 16 check bits for error). The syndrome code is also sent on line 72 to an AND gate (541) which if the result is zero indicates no error to the Error status block 83.

Block 81's AND gates generate a value from the 16 bit syndrome saying either no, this gate has no match with the value taken from the table of FIGS. 3A–C corresponding to this gate, or yes, there is a match.

Each of the 16 syndrome codes are sent through 541 AND gates (FIG. 7). Of the 541 output lines, only one may display a "1", while the other 540 show "0", (barring a failure in the AND gate hardware). The output of AND gates 0–479 are provided to OR gate 83, which should show a 1 on the output if there is an error. The 0–479 AND gates also provide output on an eight per OR gate basis to the OR gates 0–127 which represent each bit of the 128-bit data words. For any one of them which provides a 1 output, the bit represented by that gate should be flipped to change its signal value since it is determined to be in error. A cloud 79 represents the interconnections from the AND gate outputs to the OR gate inputs to simplify this exposition. Gate 541 will show a 1 if there is no correctable error detected. If there is no error shown then the 128-bit data word and it's 16-bit parity check code are good data. An error signal from one of the AND gates 0–480 indicates a particular error pattern which can be used to correct the 128 data bits by specifying what bit(s) is(are) in error. The output of the OR gates 0–128 is put into the XOR gate 85, which provides a simple means to flip any bad bits in the 128 bit data word input on line 86 to correct the bad data. The syndrome code is used to determine if there is no error, if there is a correctable error, or if there is an uncorrectable error, and are handled in the error status box 83 (see FIG. 8).

Figure 8:
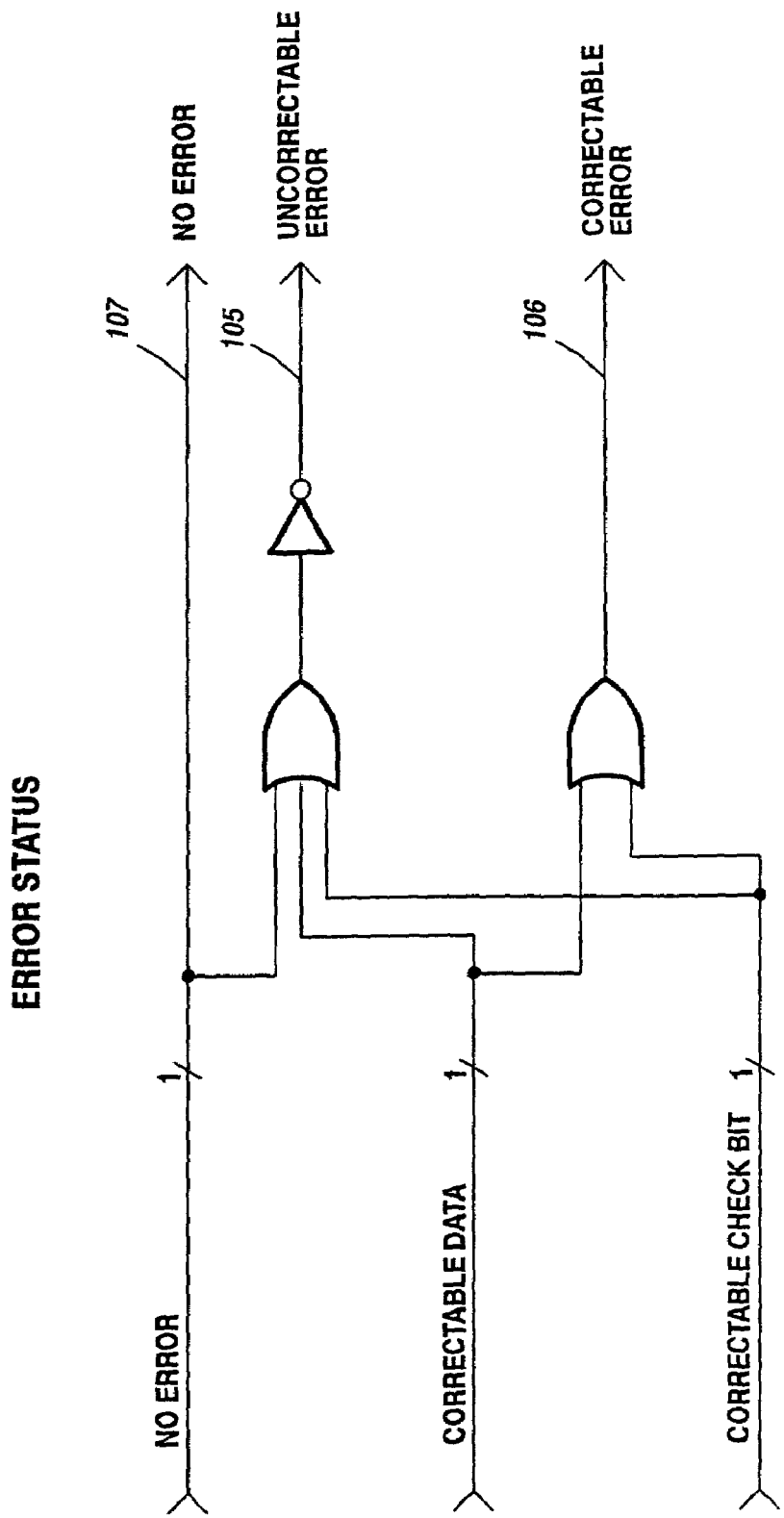
FIG. 8 is a block diagram illustrating the error status function in greater detail than the illustration of FIG. 7.

FIG. 8 provides three indicators, Error detected but uncorrectable 105, Error detected and corrected 106, and No detectable error 107, shown with abbreviated words. The NO ERROR input comes from the AND gate with the completely inverted syndrome input, producing a one only if all the syndrome bits are zero. The CORRECTABLE DATA input comes from OR gate 84 of FIG. 7. The signal CORRECTABLE CHECK BIT comes from OR gate 94 of FIG. 7, indicating that one of the 60 detectable check bit errors occurred in this data word. Thus, if line 106 is positive, one of the 540 possible detectable errors was found, and the data word was corrected based on knowing which error(s) occurred to which of the 128 plus 16 check bits. If there was no error, line 107 should be positive. However, if any two of the three inputs are positive, the output 105 should be positive, indicating an uncorrectable error and bad data in the 128-bit data word.

So, in sum, the data correction circuit can toggle up to four bits in a family and up to one bit in any family of the 128-bit word. The three status lines indicate either a no error, a correctable error, or a Multiple Uncorrectable Error (MUE). The logic need 540 AND gates to determine correction due to 36 RAM devices multiplied by 15, which is the sum of 4 single bit error possibilities within a family, 6 double bit error possibilities within a family, 4 triple bit error possibilities within a family and 1 quad bit error within a family. Number 541 arbitrarily is designated the no error. We know based on a computer calculation that none of the multiple bit errors will map into one of the correctable errors or a no error. Therefore, by compliment, if there is a no "no error" signal and there is an error signal but no correctable error signal then there must be a MUE and the word will be handled as corrupted data.

Adjacent bits are located within the same RAM device, or family, while non-adjacent bits are any two or more bits located on different RAM devices, or families, within the 144-bit word. The use of ×4 bit DRAM chips or devices are an integral aspect of the invention's organization. There are 32 RAM devices dedicated for the 128-bit word and 4 RAM devices are allocated for the 16 check bits over two standard DIMMs. It is important to realize that the multi-bit correction within a single RAM and double bit detection within two different RAMs increases the reliability of the memory, making data corruption less likely. It is further understood that data problems that occur in excess of these limitations may also be corrected or detected, but this is not guaranteed, due to the restraints of the ECC size and word size.

It is realized that the probability of any one single bit error is relatively high and this invention corrects any and all of these errors. Further, the probability of multi-bit errors in any one device is much lower than even the probability of any two non-adjacent bit errors, but these represent all the two next highest probable error types. Through the current invention all the double bit non-adjacent errors are detected, preventing data corruption, from this second most common error type. Also this invention provides single and multi-bit correction within any single RAM device. By covering the highest sources of error in server memory subsystems the probability that an error will not be corrected or even detected when utilizing the current invention is quite minuscule, which in turn increases the memory reliability at very reasonable cost. It is also important to realize that utilizing standard 64-bit ×4 bit DIMMs reduces the cost of the system greatly, adding to the value of this invention. Thus, the applicants have defined a commercially valuable subset of correctable and detectable errors and provided a description of how a particular set of ECC codes and be used to provide that the commercially valuable set of correctable and detectable errors are corrected or detected.

The Directory Store Embodiments

Figure 17:
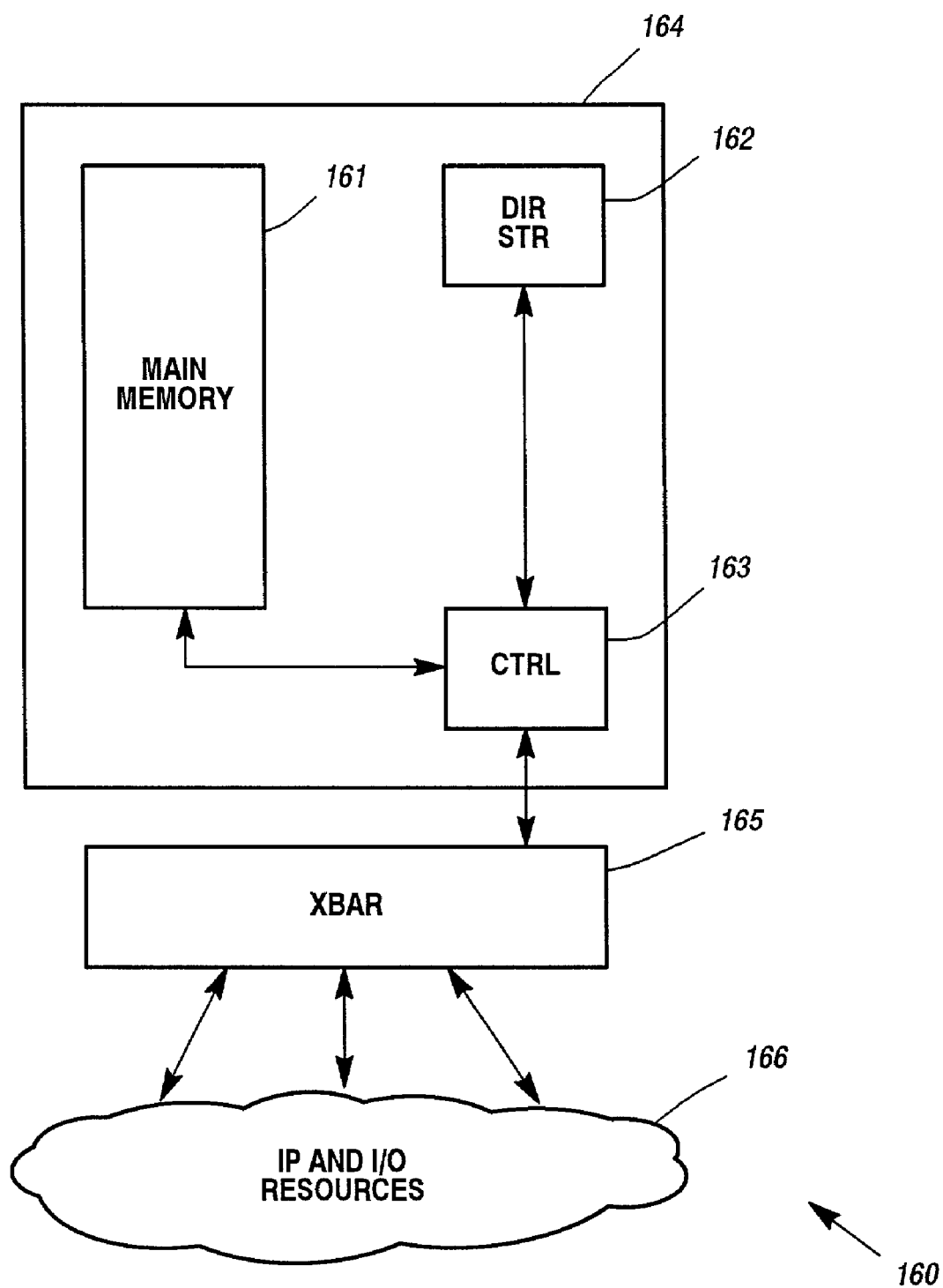
FIG. 17 is a simplified block diagram of a computer system which could employ this invention.

These embodiments are relevant to the detection and correction of errors from the directory store memory particularly, of computer systems, but could be used for smaller memory systems if desired. FIG. 17 illustrates a computer system 160 with a directory store 162 having identifying information for which of the instruction Processor and Input/Output recourses 166 may have access or control over the addresses within main memory 161. In the preferred embodiment computer systems all access to both memories 161 and 162 is controlled by a controller 163 within the memory storage unit 164. There may be several memory storage units (not shown). Access is preferably through a high speed cross bar interconnect 165, although it could be through a bus (not shown) if desired. The invention would apply to both the memory units 161 and 162 in parallel.

As mentioned previously, the code identified in FIGS. 2A–D and the variations discussed above can be used for delivering the same detection and correction features for a 20-bit memory using only 12 ECC bits. We will use this for our directory store memory in our newest ES7000 technology computer systems from the assignee of this patent, Unisys Corporation. In such systems, a directory storage memory system runs in parallel to the main memory storage system, and so data saved to the directory store memory can be checked in parallel to the main store memory as illustrated by block diagram 300 of FIG. 11. This diagram is illustrating a pair of systems such as that described above with respect to FIG. 4. Thus, the check bit generation block 420A is identical in function to the block of the same name in FIG. 4 numbered 42. A complementary block 420B handles check bit generation for the directory store memory 310B. Thus, the diagram 300 is divided into a side A which is identical in function to FIG. 4 and a side B which describes the parallel (and identically organized) function to that of FIG. 4 for side B, which handles the directory store memory. Diagram 300 also combines several blocks from FIG. 4 for ease of legibility. Thus, on side B, the 20 lines (19 . . . 0) 200 which form the data path into the directory store go through a check bit generator 420A. This is illustrated in greater detail in FIG. 4. This produces a set of 12 check bits on line 201 and the lines 200 also pass into block 310B to the directory store memory. When the directory store memory is read out, it comes out as lines 201' (the 12 check bits) and line 200' (the 20 read data bits). The directory store data and the ECC check bits are processed in the Regen and Syndrome compare block 456B, to produce the syndrome for the syndrome decode 478B, and to compare the expected data with the received from memory data on line 200'. If the stored version of the directory store data is good or correctable, it will appear on line 200". If it is uncorrectable, a signal will be send to the Bad Data Path (BDP) 450, aborting any operation that might use this directory store data. On the A side, main memory data that is uncorrectable will also indicate the segment of memory should not be trusted and will be appropriately handled at the bad data path block 450. The operation for the BDP 450 when the directory store data is bad and uncorrectable is to shut down the operation, since this means the memory system does not know which part of the system owns the memory. If the main memory store data is bad and uncorrectable, one merely has to inform the process that it has bad data. The directory store identifies the owner of the data so it is not possible (except in some limited circumstances) to know what program owns the corrupted data, thus, requiring all operations of the system to be suspended to avoid further contamination.

Thus is should be understood that the workings of the directory store ECC and error correction function to correct all familial bit errors and catch all double bit non-familial errors is the same as the workings of the 128 bit data word ECC function with the limitations and changes described above. However, to be completely clear, several of the Figs. required to explain how the 128 bit ECC and error correction function works are also modified to provide a more explicit explanation.

Figure 12:
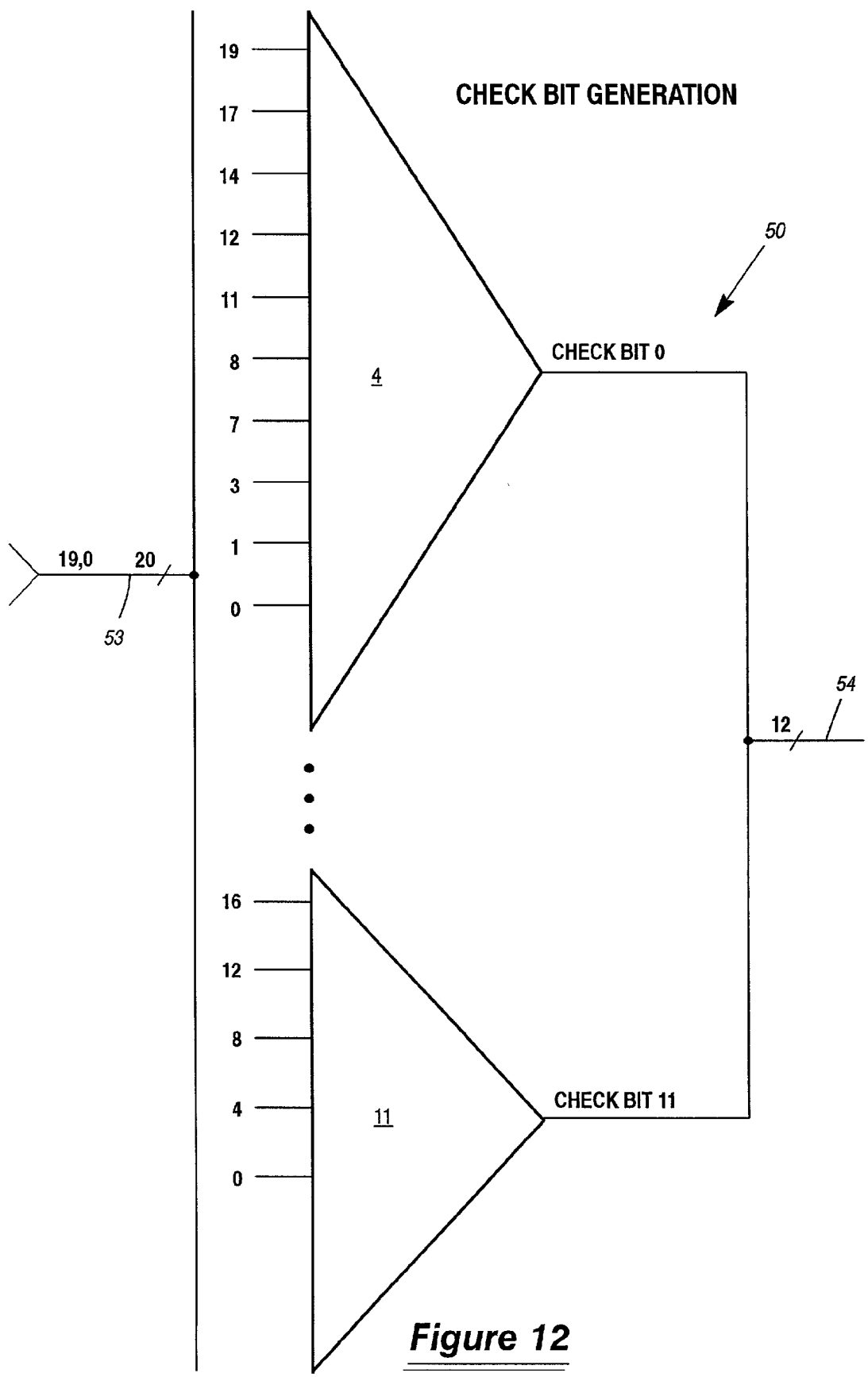
FIG. 12 is a block diagram illustrating two branches of a parity tree in accord with the preferred embodiment of the invention, organized in accord with the abbreviated directory store portion of the table of error correction codes of FIG. 2A.

First refer to FIG. 12, a reworking of FIG. 5. Note that the difference here is in the number of signal lines input and that the configuration still is dependent from the table of code set forth in the table of FIGS. 2A–D. Here however, the portion of the table required is only a subset of that shown in the table of FIG. 2A. Thus, referring to the table in FIG. 2A, looking at the right-most row numerals corresponding to ECC 4–ECC15 section and the top-most numerals corresponding to rows 127–108, we have the relevant part of the code boxed out. (An additional figure, FIG. 2E provides just that segment.) We could use rows 107–104 which also conveniently allows for elimination of data from ECC0–ECC3, since in this formula all these rows up to column 104 are zeros. Likewise, as explained previously, so long as the families remain intact, the columns can be jiggered such that for instance the column set 127–124 (also seen here as 19–16) could be substituted positionally for column set 115–112 (also seen here as 7–4). Additionally, since we are working with a separable set of codes and decoding mechanism independent from the one used for the main memory, we can jigger the column sets differently if desired. However, given the propensity for potential error, we would prefer using the same FIG. 2-*type* code column configuration for both the main memory and for the directory store.

Figure 13A:
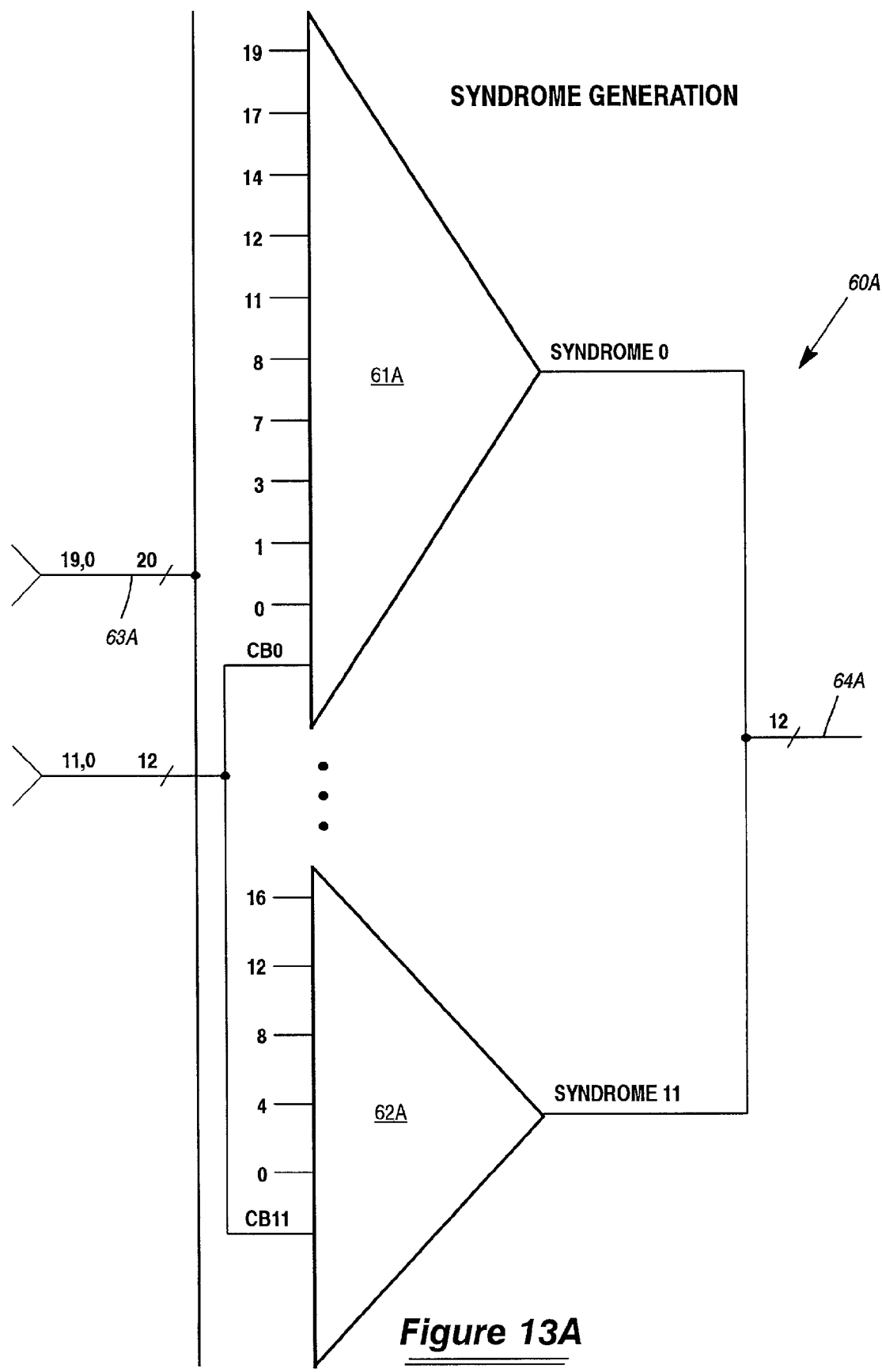
FIGS. 13A and 13B are also block diagrams illustrating two branches of a parity tree in accord with the preferred embodiment of this invention. They are basically abbreviated versions of FIG. 6B and FIG. 6A, respectively.
Figure 13B:
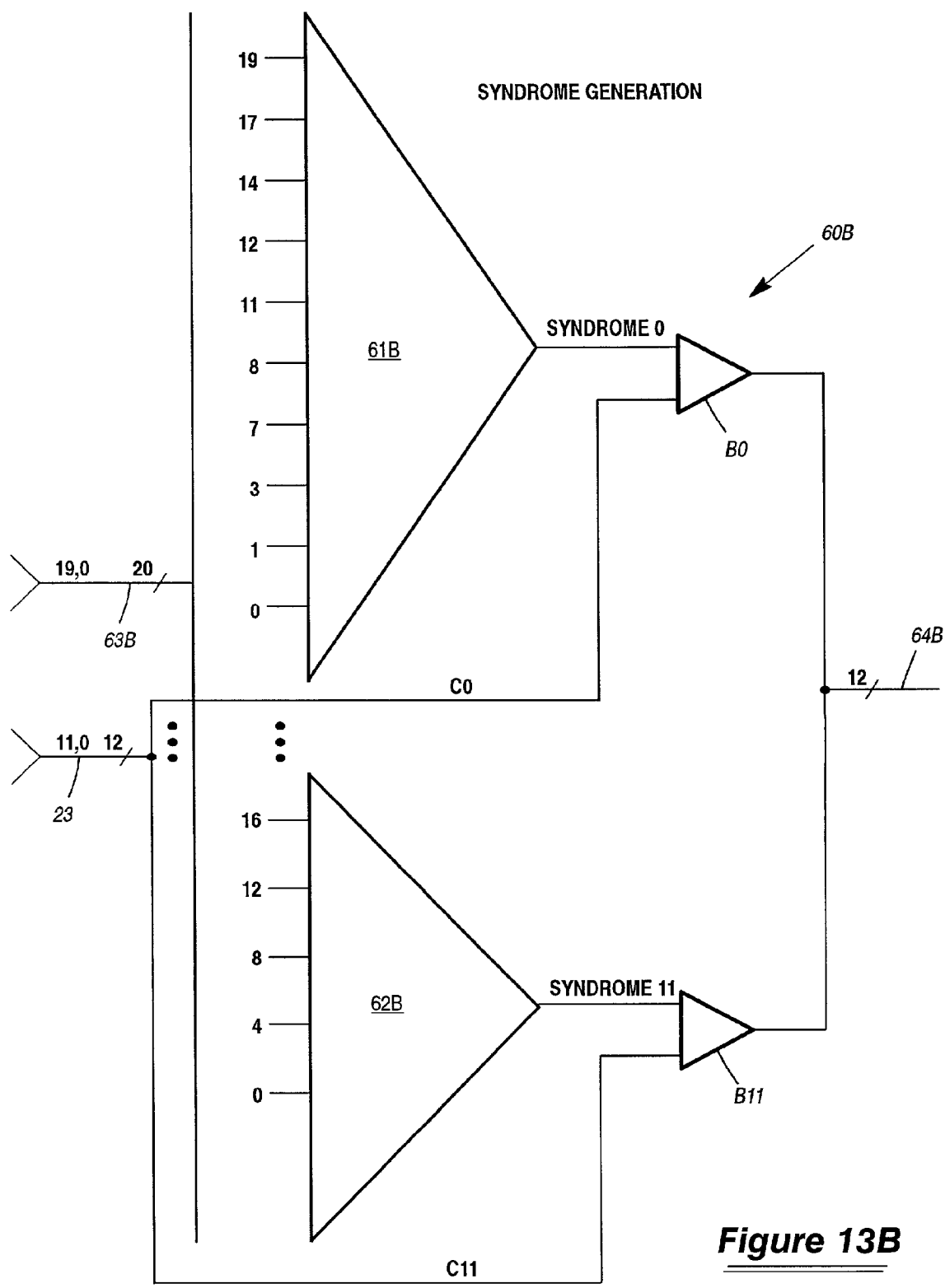

Thus, in using the code blocked out from FIG. 2A (or the code in the table of FIG. 2E which is the same), check bit generation will occur through a check bit generation set of XOR gates 4–11 of FIG. 12. FIG. 12 is of course the same configuration described for FIG. 5, but with a limited set of inputs (as specified by the boxed portion of the code of FIG. 2A), having 20 directory store data input lines and 12 directory store check bit output lines. FIGS. 13A and 13B corresponds similarly to FIGS. 6A and 6B, again with 20 input lines and 12 output lines, but in FIGS. 13A and 13B producing a syndrome code for the directory store. The changes to FIG. 4 to explain the implementation of the directory store ECC and error correction/detection are so limited as to be not useful to reproduce. The only change required would be to change the numerals 127 to 19 in the two places they occur and the numeral 15 to 11 in the one place it occurs. Thus there are only 20 data input lines and 12 ECC data bits from the directory store RAM devices.

(In the applicant's assignee's actual computer systems, there are actually only 19 of those data lines required for the directory store, but the one extra line is used as an extra bit with no consequence, unless it changes state while in memory, i.e., goes bad, in which case it would trigger detection and in the cases indicated, correction of itself. It is reasonable to assume there is not any difference in using this $20^{th}$ bit, and this is only mentioned due to the best mode requirement of the law.)

Figure 15:
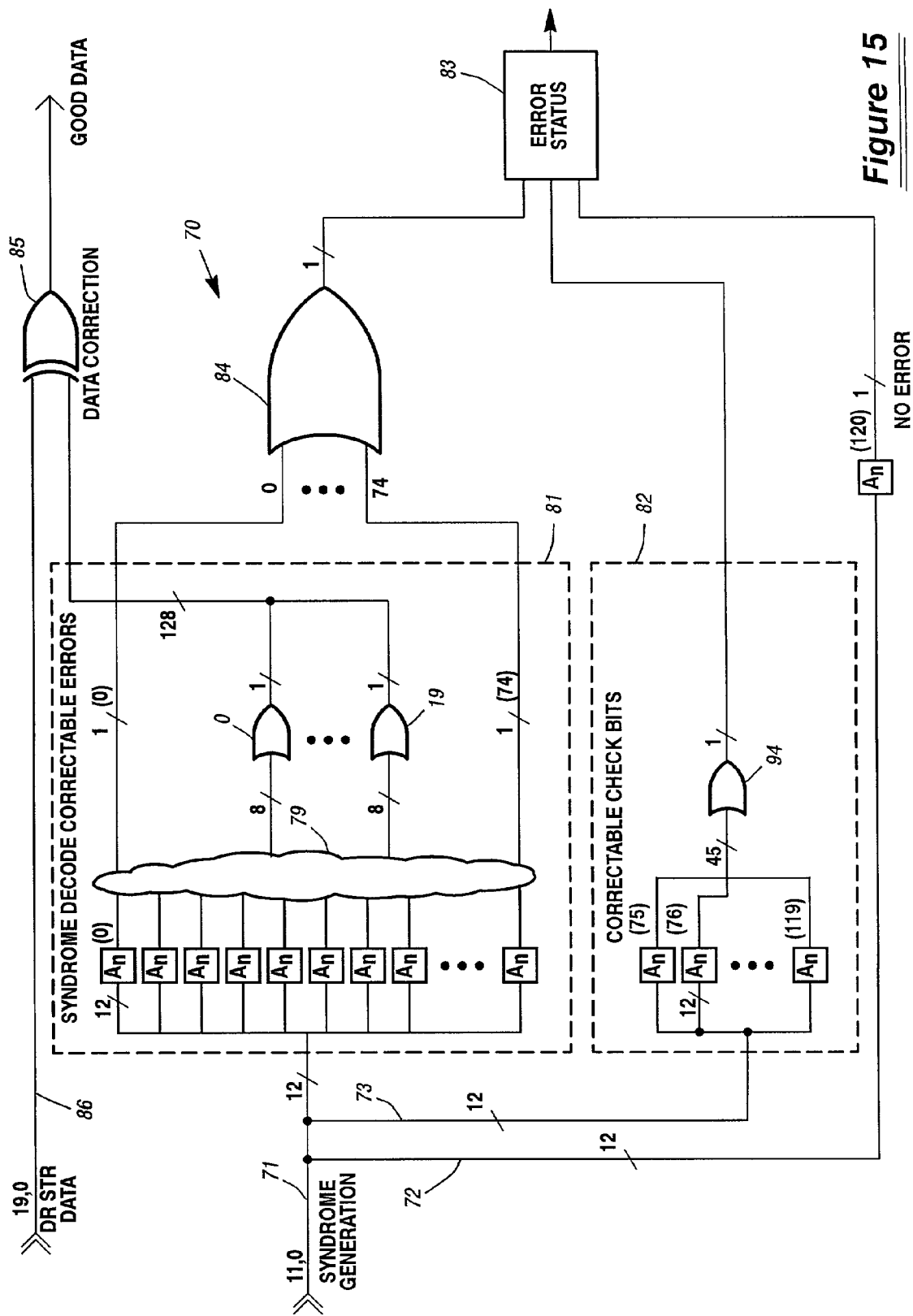
FIG. 15 is a block diagram illustrating an abbreviated version of FIG. 7, accommodating the fewer bits of this directory store version of this invention.
Figure 16A:
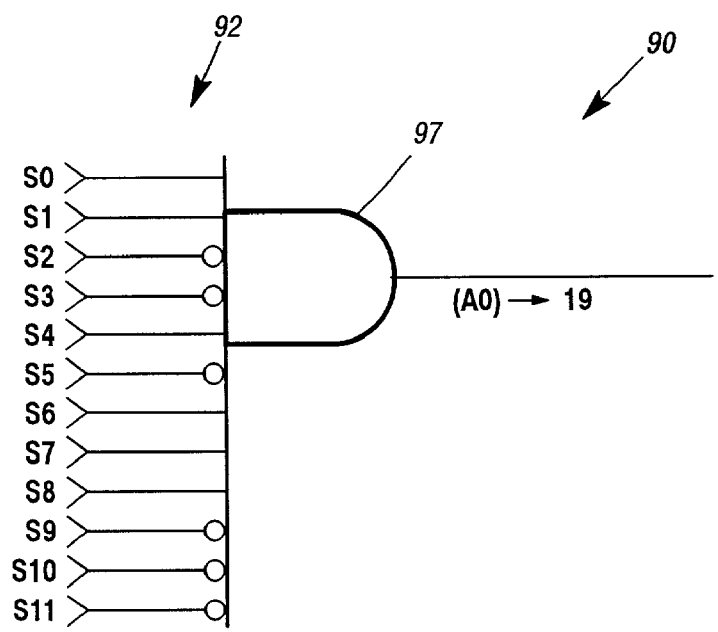
FIG. 16A and 16B are versions of the AND gates of FIGS. 9A and 9B, respectively, accommodating the abbreviated embodiment for directory store.
Figure 16B:
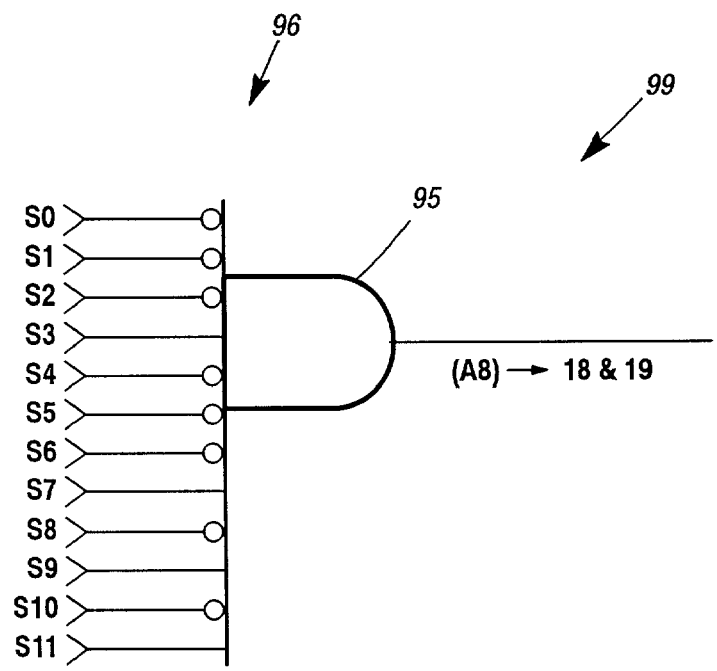

FIG. 7 is redrawn also to produce FIG. 15, to show the limited number of gates required for syndrome decode for only 20 data bits for the directory store implementation. Thus only 120 OR gates are required for all correctable errors, and 75 of those (gates 0–74) for the data portion of the directory store memory. AND gate 120 produces the NO ERROR signal for the ERROR STATUS section 83. All other lines are identical, with only 20 directory store data input lines going to the data correction XOR gate to give the GOOD DATA signal if there are no outputs from gates 0–74. FIG. 8 functions identically for the directory store with the same number of input lines and the same meaning to the output line data.

The AND gates for the FIG. 15 blocks 81 and 82 are slightly different for this embodiment as well. They have only 12 input lines instead of 15, and the arrangement of the inverted inputs from those lines into the AND gates is the same as the inputs to the same AND gates except that the first four syndrome lines for the main memory data AND gates are missing, corresponding to the blocked off portion (ECC0–ECC3) of the FIG. 2A code.

Figure 14:
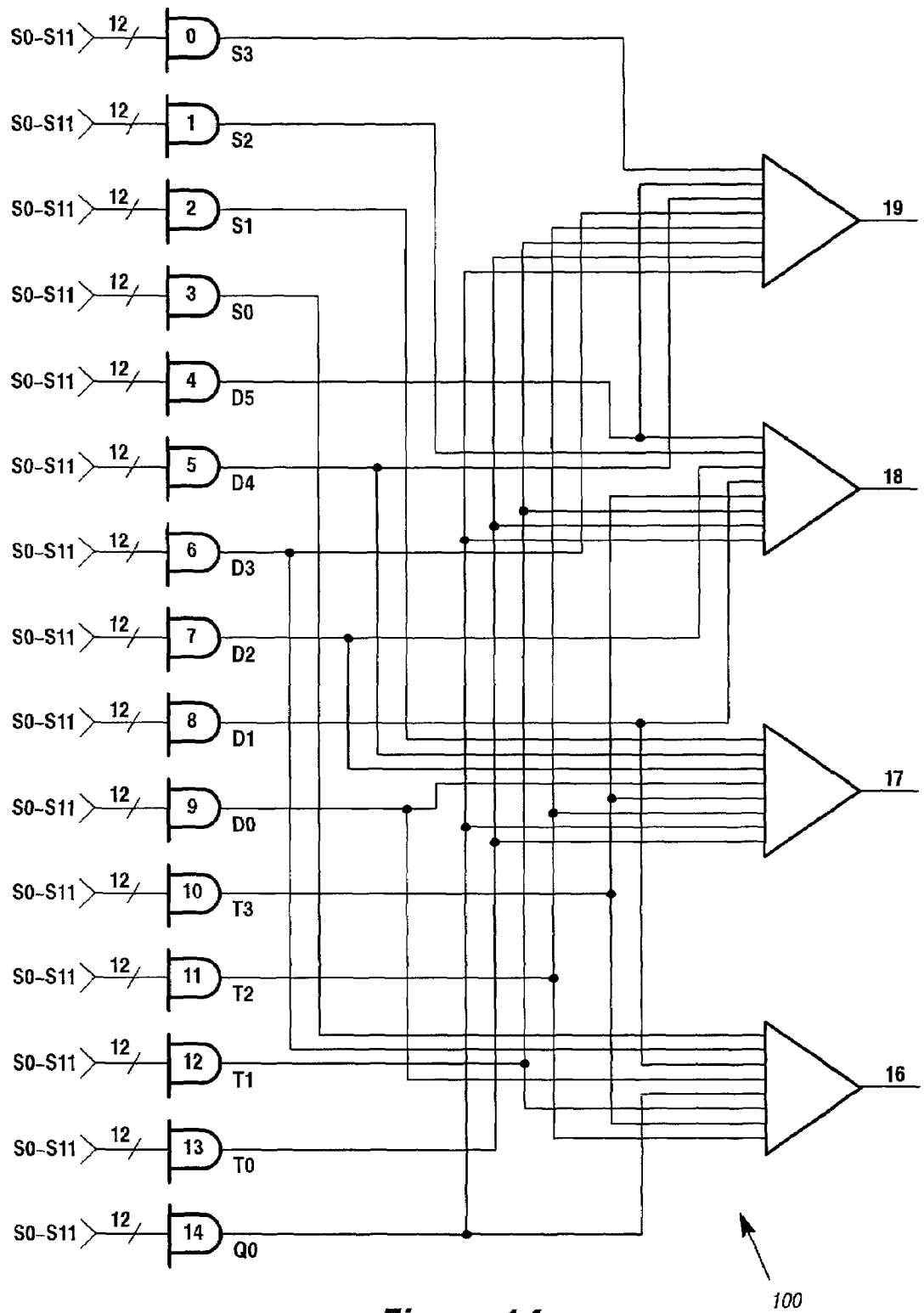
FIG. 14 is a block diagram similar to that of FIG. 10, but for the directory store embodiment of this invention.

FIG. 14 shows how the outputs from AND gates like those of FIG. 13A and 13B are fed to the OR gates 0–19 of FIG. 15. There are only 4 of the OR gates shown in FIG. 14, gates 19–16. Note that this configuration is also dictated by the blocked out segment of FIG. 2A which illustrated the inventive code, as interpreted through the table of possible errors illustrated in FIG. 1.

With those limitations and minor changes, the functioning of the ECC code production and use for the directory store memory of 20 data bits from the code of 12 data bits is described. This could of course be used in any computation system requiring 20 data bit fields, separately from the main memory directory store apparatus described herein if that is desirable, and many modifications will be apparent to one of skill in this art.

Accordingly, the invention is limited only by the following appended claims.

What is claimed is:

1. Apparatus for detecting and correcting all 15 possible familial bit errors in data from any single 4-bit RAM in a first data word of 20 bits and for also detecting all double bit, non-familial errors and for detecting uncorrectable multi-bit errors in said first 20 bit word, wherein said first 20 bit word is a data word storable in a RAM memory within a computer system and retrievable therefrom, and wherein said computer system has input circuits to said RAM memory for sending said first data word to storage in said RAM memory and output circuits for retrieving a 128 bit data word from said storage in said RAM memory, wherein said retrieved 20 bit data word will be equivalent to said first data word if no errors occur, said apparatus comprising:

a check bit generator associated with said input circuits for generating in a predetermined manner, a generated 12 check bits from said 20 bit data word and for sending said generated 12 check bits together with said 20 bit data word into said RAM memory for storage associated with said 20 bit data word as stored check bits, a check bit regenerator associated with said output circuits for generating in said predetermined manner, a regenerated 12 check bits from said retrieved 20 bit data word, a syndrome generator for generating 12 syndrome bits from said regenerated 12 check bits wherein each of said regenerated 12 check bits is modula2 added to a one of said generated check bits, producing thereby a 12 bit syndrome, a syndrome decode and comparator circuit for producing a no error signal, a correctable data signal, and a correctable check bit signal, wherein said correctable data signal is produced by determining if a correction was required by decoding said 12 bit syndrome through a syndrome decode circuit, said correctable check bit signal is produced by determining if a correction is required for said generated 12 check bits, and wherein said no error signal is produced if said syndrome signal value is a predetermined value and further comprising:

a multi-bit undetectable (MUE) error signal generating circuit for generating an MUE signal if a said no error signal indicates an error and either of said correctable check bit signal or said correctable data signal.

2. The apparatus of claim 1 wherein said predetermined syndrome signal value that produces said no error signal is zero.

3. The apparatus of claim 2 wherein said RAM memory stores said first data word into one half of a 72 bit Dual In-Line Memory Module along with said 12 generated check bits.

4. The apparatus of claim 2 wherein said 20 bit memory is a directory store.

5. The apparatus of claim 2 wherein said check bit generation circuit is an XOR tree of inputs from said first data word, wherein said inputs are connected to 12 branches and wherein each branch produces an output of one bit said output of one bit from all 12 branches being said generated 12 check bits.

6. The apparatus of claim 5 wherein each said branch is connected to receive only some of said inputs from said first data word, wherein which bits of said first data word are supplied as inputs to which branches is determined by a predetermined familial pattern code of 20 by 12 bits.

7. The apparatus of claim 6 wherein said predetermined 20 by 12 bit familial pattern code is set forth herewithin:

-continued

| | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 |
|---|---|---|---|---|---|---|---|---|---|---|---|---|---|---|---|---|---|---|---|---|---|---|---|---|---|---|---|
| ECC 11 | 1 | | 1 | 1 | | | | | | 1 | 1 | | | | | | | | | | | | | | | | |
| ECC 12 | | | 1 | | | | | | | | 1 | | | | | 1 | | | | | 1 | | | | 1 | | |
| ECC 13 | 1 | | | | | 1 | | | | | | | 1 | | | | | | | 1 | | 1 | | | | | |
| ECC 14 | 1 | | 1 | | 1 | | | 1 | | 1 | | | | | | | | 1 | | | | | 1 | | | | |
| ECC 15 | | 1 | | | | | | | 1 | | | | | 1 | | | | | | | | | | | | 1 | 1 |

| | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| ECC 0 | 1 | 1 | 1 | 1 | 1 | 1 | 1 | 1 | 1 | 1 | 1 | 1 | 1 | 1 | 1 | 1 | 1 | | 1 | 1 |
| ECC 1 | 1 | 1 | 1 | 1 | 1 | 1 | 1 | 1 | 1 | 1 | 1 | 1 | 1 | 1 | 1 | 1 | 1 | 1 | 1 | 1 |
| ECC 2 | 1 | 1 | 1 | 1 | 1 | 1 | 1 | 1 | | 1 | 1 | 1 | 1 | 1 | | | 1 | 1 | | |
| ECC 3 | | 1 | 1 | 1 | 1 | 1 | 1 | 1 | 1 | 1 | 1 | 1 | 1 | 1 | 1 | 1 | 1 | 1 | | |
| ECC 4 | | 1 | | 1 | 1 | 1 | 1 | 1 | 1 | 1 | 1 | 1 | | 1 | 1 | 1 | | | | |
| ECC 5 | 1 | 1 | 1 | 1 | 1 | 1 | 1 | | | 1 | | 1 | 1 | | 1 | | 1 | | | |
| ECC 6 | 1 | 1 | | 1 | 1 | | 1 | 1 | 1 | 1 | 1 | | 1 | 1 | 1 | 1 | | 1 | 1 | |
| ECC 7 | | 1 | 1 | | 1 | 1 | 1 | 1 | 1 | | | 1 | 1 | 1 | | 1 | 1 | 1 | 1 | |
| ECC 8 | 1 | 1 | 1 | | | | 1 | 1 | 1 | 1 | 1 | 1 | | | 1 | 1 | 1 | 1 | 1 | 1 |
| ECC 9 | | 1 | 1 | 1 | | | | 1 | 1 | 1 | 1 | 1 | 1 | | | 1 | 1 | | 1 | |
| ECC 10 | 1 | 1 | | | | | 1 | | 1 | 1 | 1 | | | 1 | 1 | | 1 | 1 | | 1 |
| ECC 11 | | 1 | | | 1 | 1 | | 1 | | 1 | 1 | 1 | 1 | 1 | | 1 | 1 | 1 | 1 | |
| ECC 12 | 1 | | 1 | 1 | 1 | 1 | 1 | 1 | 1 | | 1 | | 1 | 1 | | 1 | | 1 | | |
| ECC 13 | | | | | | 1 | | | 1 | 1 | | 1 | | 1 | 1 | | 1 | | 1 | |
| ECC 14 | | | | | | | | | | | | | | | | | | | | |
| ECC 15 | 1 | | | | | | | | | | | | | | | 1 | | | | 1 |

8. The apparatus of claim 5 wherein a predetermined coded bit pattern describes all links between said data inputsconnected to each of said 12 branches and wherein said predetermined 20 by 12 bit coded bit pattern is equivalent to a bit pattern set forth herewithin:

| | 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 |
|---|---|---|---|---|---|---|---|---|---|---|---|---|---|---|---|---|---|---|---|---|---|---|---|---|---|---|---|
| ECC 0 | | | | | | | | | | | | | | | | | | | | | | | | | 1 | | 1 |
| ECC 1 | | | | | | | | | | | | | | | | | | | | | | | | | 1 | | |
| ECC 2 | | | | | | | | | | | | | | | | | | | | | | | | | | 1 | |
| ECC 3 | | | | | | | | | | | | | | | | | | | | | | | | | | | |
| ECC 4 | 1 | | 1 | | | 1 | | 1 | 1 | | | 1 | 1 | | | | 1 | | 1 | 1 | | 1 | | 1 | 1 | | |
| ECC 5 | 1 | | | | 1 | | | 1 | 1 | | 1 | 1 | | 1 | 1 | | | 1 | | | 1 | | 1 | | | 1 | |
| ECC 6 | | 1 | | 1 | 1 | | | | | 1 | 1 | | | | 1 | | 1 | | 1 | | | | | 1 | 1 | | 1 |
| ECC 7 | | | | 1 | | 1 | 1 | 1 | 1 | 1 | 1 | | 1 | | | 1 | 1 | 1 | | | 1 | | | | 1 | | 1 |
| ECC 8 | 1 | | | | 1 | | 1 | | 1 | | | 1 | | 1 | | 1 | | 1 | | 1 | 1 | | | | 1 | | |
| ECC 9 | | 1 | | 1 | 1 | | | | 1 | | 1 | 1 | 1 | 1 | | 1 | 1 | | 1 | | | 1 | 1 | | | 1 | |
| ECC 10 | 1 | | 1 | | | 1 | | 1 | | 1 | 1 | | 1 | | 1 | | | | | 1 | | 1 | 1 | 1 | 1 | | 1 |
| ECC 11 | 1 | | 1 | 1 | | | | 1 | 1 | 1 | 1 | | | | | 1 | 1 | | | | 1 | 1 | | | 1 | | 1 |
| ECC 12 | 1 | | | | 1 | | | | 1 | | | | 1 | | | | 1 | | | | 1 | | | | 1 | | |
| ECC 13 | | 1 | | | | 1 | | | | 1 | | | | 1 | | | | 1 | | | | 1 | | | | 1 | |
| ECC 14 | | | 1 | | | | 1 | | | | 1 | | | | 1 | | | | 1 | | | | 1 | | | | 1 |
| ECC 15 | | | | 1 | | | | 1 | | | | 1 | | | | 1 | | | | 1 | | | | 1 | | | |

| | 100 | 99 | 98 | 97 | 96 | 95 | 94 | 93 | 92 | 91 | 90 | 89 | 88 | 87 | 86 | 85 | 84 | 83 | 82 | 81 | 80 | 79 | 78 | 77 | 76 | 75 | 74 |
|---|---|---|---|---|---|---|---|---|---|---|---|---|---|---|---|---|---|---|---|---|---|---|---|---|---|---|---|
| ECC 0 | | 1 | | 1 | | 1 | | 1 | | 1 | | 1 | | 1 | | 1 | | 1 | | 1 | | | 1 | | 1 | | 1 |
| ECC 1 | | 1 | | | | 1 | | | | 1 | | | | 1 | | | | 1 | | | | 1 | | | 1 | 1 | |
| ECC 2 | 1 | | 1 | | 1 | | 1 | | 1 | | 1 | | 1 | | 1 | | 1 | | 1 | | 1 | 1 | | | | 1 | |
| ECC 3 | 1 | | | | 1 | | | | 1 | | | | 1 | | | | 1 | | | | 1 | | 1 | 1 | 1 | | 1 |
| ECC 4 | | 1 | | 1 | | | 1 | | 1 | 1 | | | 1 | | | 1 | 1 | 1 | | 1 | | 1 | | | | 1 | |
| ECC 5 | 1 | 1 | | | | 1 | | | 1 | 1 | | 1 | 1 | | | 1 | | 1 | 1 | | 1 | | 1 | | 1 | 1 | |
| ECC 6 | | | 1 | | 1 | 1 | | | | | 1 | 1 | | 1 | | | 1 | 1 | 1 | | | 1 | | 1 | | | 1 |
| ECC 7 | 1 | | | | 1 | | 1 | 1 | 1 | 1 | 1 | 1 | | 1 | 1 | | 1 | | | 1 | | 1 | | 1 | 1 | | |
| ECC 8 | | | 1 | | 1 | 1 | | | 1 | 1 | | 1 | | | | | 1 | | | 1 | | 1 | | 1 | | 1 | |
| ECC 9 | 1 | 1 | | | 1 | 1 | | 1 | 1 | 1 | | | | 1 | | 1 | | | 1 | 1 | | 1 | | | | 1 | |
| ECC 10 | | 1 | | | | | 1 | 1 | | | 1 | | 1 | 1 | | | 1 | 1 | 1 | | 1 | | 1 | | 1 | | 1 |
| ECC 11 | 1 | | 1 | 1 | 1 | 1 | 1 | 1 | | | | | 1 | 1 | 1 | 1 | | 1 | 1 | | | | | | 1 | 1 | 1 |
| ECC 12 | | 1 | | | | 1 | | | | 1 | | | | 1 | | | | 1 | | | | 1 | | | | 1 | |
| ECC 13 | | | 1 | | | | 1 | | | | 1 | | | | 1 | | | | 1 | | | | 1 | | | | 1 |
| ECC 14 | | | | 1 | | | | 1 | | | | 1 | | | | 1 | | | | 1 | | | | 1 | | | |
| ECC 15 | 1 | | | | 1 | | | | 1 | | | | 1 | | | | 1 | | | | 1 | | | | 1 | | |

| | 73 | 72 | 71 | 70 | 69 | 68 | 67 | 66 | 65 | 64 | 63 | 62 | 61 | 60 | 59 | 58 | 57 | 56 | 55 | 54 | 53 | 52 | 51 | 50 | 49 | 48 | 47 |
|---|---|---|---|---|---|---|---|---|---|---|---|---|---|---|---|---|---|---|---|---|---|---|---|---|---|---|---|
| ECC 0 | | 1 | | 1 | | 1 | | 1 | | 1 | | 1 | | 1 | | 1 | | 1 | | 1 | | 1 | 1 | | | 1 | 1 |
| ECC 1 | | 1 | 1 | | | 1 | 1 | | | 1 | 1 | | | 1 | 1 | | | 1 | 1 | | | 1 | 1 | | 1 | 1 | 1 |
| ECC 2 | | | 1 | | | | 1 | | | | 1 | | | | 1 | | | | 1 | | | | | 1 | 1 | | |
| ECC 3 | 1 | 1 | | 1 | 1 | 1 | | 1 | 1 | 1 | | 1 | 1 | 1 | | 1 | 1 | 1 | | 1 | 1 | 1 | 1 | 1 | 1 | | 1 |
| ECC 4 | 1 | | | 1 | | 1 | 1 | | | 1 | | | 1 | 1 | | 1 | 1 | 1 | | | | | 1 | | | | 1 |
| ECC 5 | | | 1 | | | 1 | 1 | | 1 | 1 | | | 1 | | 1 | | 1 | | | | | | | 1 | | 1 | 1 |
| ECC 6 | | 1 | 1 | | | | | 1 | 1 | | 1 | | | 1 | | 1 | 1 | | | | | | 1 | | 1 | | |
| ECC 7 | | 1 | | 1 | 1 | 1 | 1 | 1 | 1 | | 1 | 1 | | 1 | 1 | | | | | | | | 1 | | 1 | 1 | |
| ECC 8 | | 1 | 1 | | | | | 1 | | 1 | | 1 | 1 | 1 | | | | | 1 | | 1 | | | 1 | 1 | | 1 |
| ECC 9 | 1 | 1 | | 1 | | 1 | 1 | | | 1 | 1 | | 1 | | | | | | 1 | 1 | | 1 | | | | 1 | |
| ECC 10 | 1 | | 1 | | 1 | | 1 | | | | | 1 | 1 | | | | | | 1 | 1 | | | 1 | | | 1 | |

-continued

9. The apparatus of claim 8 wherein said syndrome generator circuit is equivalent to said check bit generation circuit in its pattern of data inputs except said pattern of data inputs to said syndrome generator circuit receive data input from data bits stored in said RAM memory instead of data being stored into said RAM memory, and also one of each of the 12 check bits is XORed with each of the 12 branches of said syndrome generator circuit.

10. The apparatus of claim 9 wherein said syndrome generator circuit output provides information indicating which if any family of data bits is in error, and which of those bits in said indicated family is in error, and if there are additional errors when said syndrome generator output passes through a syndrome decode circuit of said apparatus.

11. An apparatus as set forth in claim 2 further comprising a syndrome decode circuit, said syndrome decode circuit for receiving output from said syndrome generator and decoding it into signals indicating which bits of said data word are in error, said syndrome decode circuit comprising:
   a first parallel network of gates for receiving said syndrome to decode for said 20 bit data word, said first parallel network having 75 parts each part receiving all 12 bits of said syndrome and, together with three other such parts in a familial group of such parts, indicating whether there is error for each of 4 familial bits of said data word,
   a second parallel network of gates for receiving said syndrome, said network having 45 parts each part receiving all 12 bits of said syndrome and, together with three other such parts in a familial group of such parts, indicating whether there is error for each of 4 familial bits of the check bits related to said data word.

12. The apparatus of claim 11 wherein said second parallel network produces a single error bit output if any of the bits of said parallel network indicate error.

13. Apparatus for detecting and correcting all 15 possible familial bit errors in data from any single 4-bit RAM in a first 20 bit directory data word of a directory store and in a contemporaneously addressed first 128 bit memory data word of a main store, and for also detecting all double bit, non-familial errors and for detecting uncorrectable multi-bit errors in said first words, wherein said first 20 bit word is a data word storable in a RAM directory store memory within a computer system which generates 12 check bits from said 20 bit data word when sending said first 20 bit directory data word to said RAM directory store memory, and wherein both said 20 bit data word and said 12 bit check bit data are retrievable together from said directory store memory, wherein said first 128 bit memory word is a data word storable in a RAM main store memory within a computer system which generates 16 check bits from said first 128 bit memory data word when sending said first 128 bit memory data word to said RAM main store memory, and wherein both said 128 bit data word and said 16 bit check bit data are retrievable together from said RAM main store memory, and wherein said computer system has input circuits to said directory and main stores for sending said both said first data words to said RAM directory store and RAM main store memories, respectively, and output circuits for retrieving from said RAM main store memory, a retrieved 128 bit memory data word and from said RAM directory store memory, a retrieved 20 bit data word, respectively, and wherein said respectively retrieved bit data words will be equivalent to said first data words if no errors occur, said apparatus comprising:
   a check bit regenerator associated with said output circuits for generating in said predetermined manner, a regenerated 12 check bits from said retrieved 20 bit directory data word, and a regenerated 16 check bits from said retrieved 128 bit data word,
   a syndrome generator for generating 12 syndrome bits from said regenerated 12 check bits wherein each of said regenerated 12 check bits is modula2 added to a one of said generated check bits, producing thereby a 12 bit directory word syndrome, and for generating 16 syndrome bits from said regenerated 16 check bits wherein each of said regenerated 16 check bits is modula2 added to a one of said generated check bits, producing thereby a 16 bit memory word syndrome,
   a syndrome decode and comparator circuit for producing a no memory word error signal, a correctable memory word data signal, and a correctable check bit memory word signal for said retrieved memory word and said memory word syndrome, and for producing a no directory word error signal, a correctable directory word data signal, and a correctable check bit directory word signal for said retrieved directory word and said directory word syndrome,
   wherein said correctable data word memory signal is produced by determining if a correction was required by decoding said 16 bit memory word syndrome through a memory word syndrome decode circuit and by decoding said 16 bit memory syndrome through a memory word syndrome circuits,
   wherein said correctable check bit memory signal is produced by determining if a correction is required for said generated 16 check bits,
   and wherein said no error signal is produced if said memory word syndrome signal value is a predetermined value,
   and wherein said correctable data directory word signal is produced by determining if a correction was required by decoding said 12 bit directory word syndrome through a directory word syndrome decode circuit and by decoding said 12 bit directory syndrome through a directory word syndrome circuit,
   wherein said correctable check bit directory signal is produced by determining if a correction is required for said generated 12 check bits,
   and wherein said no error signal is produced if said directory word syndrome signal value is a predetermined value.

14. The apparatus of claim 13 wherein said check bit regenerator, said syndrome generator, and said syndrome decode and comparator circuit operate in parallel wherein detecting and correcting of said 20 first 20 bit directory word and of said 128 bit memory word occurs in parallel.

15. Method for detecting and correcting all 15 possible familial bit errors in data from any single 4-bit RAM family in a first directory data word of 20 bits and for also detecting all double bit, non-familial errors and for detecting uncorrectable multi-bit errors in said first 20 bit directory word, wherein said first 20 bit directory word is a data word storable into in a RAM directory memory store within a computer system and retrievable therefrom, and wherein said computer system for performing said method has input circuits to said memory for sending said first directory data word to said RAM directory memory store and output circuits for retrieving from storage a retrieved 20 bit directory data word from said RAM directory memory store, wherein said retrieved 20 bit directory data word will be equivalent to said first directory data word if no errors occur, said method for, in parallel, detecting and correcting all 15 possible familial bit errors in data from any single 4-bit RAM family in a first memory data word of 128 bits and for also detecting all double bit, non-familial errors and for detecting uncorrectable multi-bit errors in said first 128 bit memory word, wherein said first 128 bit memory word is a data word storable into in a RAM main memory store within a computer system and retrievable therefrom, and wherein said computer system for performing said method has input circuits to said memory for sending said first memory data word to said RAM main memory store and output circuits for retrieving from storage a retrieved 128 bit data word from said RAM main memory store, wherein said retrieved 128 bit directory data word will be equivalent to said first directory data word if no errors occur, said method comprising:

a) for a first directory data word, providing a 12 bit check bit directory ECC output for said first directory data word at any time said first directory data word is to be stored in said RAM directory memory store, and storing said provided 12 bit check directory ECC bit output with said first data word, and in parallel for a related memory data word, providing a 16 bit check bit directory ECC output for said first directory data word at any time said first directory data word is to be stored in said RAM directory memory store, and storing said provided 16 bit check memory ECC bit output with said first data word, b) retrieving said first directory data word along with said stored 12 bit directory ECC check bit output, while in parallel, retrieving said first memory data word along with said stored 16 bit check bit memory ECC output, while in parallel, c) producing a 12 bit syndrome from said stored 12 bit check bit directory ECC output, while in parallel producing a 16 bit syndrome from said stored 16 bit check bit memory ECC output, d) determining if said 12 bit syndrome is a predetermined value and if it is said predetermined value, generating a "no directory error" signal, while in parallel determining if said 16 bit syndrome is a predetermined value and if it is said predetermined value, generating a "no memory error" signal, e) decoding said 12 bit syndrome to indicate which, if any, of said 20 bits of said retrieved first directory data word are in correctable error and, if any are in correctable error, producing a "correctable directory error" signal and a directory correction signal indicating which of said 20 bits of said retrieved first directory data word are in correctable error, while in parallel decoding said 16 bit syndrome to indicate which, if any, of said 128 bits of said retrieved first memory data word are in correctable error and, if any are in correctable error, producing a "correctable memory error" signal and a memory correction signal indicating which of said 128 bits of said retrieved first memory data word are in correctable error, f) correcting any correctable error, and g) producing an "uncorrectable directory error" signal if either (i) said correctable directory error signal and said no directory error signal do not agree, or (ii) said correctable directory ECC error signal and said no error directory signal do not agree, otherwise, producing a "good directory data" signal, and in parallel, producing an "uncorrectable memory error" signal if either (i) said correctable memory error signal and said no memory error signal do not agree, or (ii) said correctable memory ECC error signal and said no error memory signal do not agree, otherwise, producing a "good memory data" signal.

16. The method of claim 15 further comprising using said indication of which of said 20 bits of said retrieved directory data word and which of said 128 bits of said retrieved memory data word are in correctable error to notify another system of potential bad chips.

17. The method of claim 15 further comprising using said uncorrectable directory data signal to terminate processing of said first memory data word because an unknown ownership condition will then exist for said first memory data word.

18. A computer system using paired data correction systems having a full set of ECC codes applied to the reading in and out of a first data word from main memory and a subset of said full set of ECC codes applied to the reading in and reading out of a first directory store word associated with said first data word wherein said full set of ECC codes produces a set of check bits for said first data word and said partial set of ECC codes produces a set of check bits for said first directory store word through parallelly functioning circuitry.

19. A computer system as set forth in claim 18 wherein said full set of ECC codes forms a memory data word ECC circuit for producing a memory data word syndrome from a retrieved data word from said main memory and wherein said partial set of ECC codes forms a directory data word ECC circuit for producing a directory data word syndrome from a retrieved directory word from said directory store.

20. A computer system as set forth in claim 19 wherein a memory word syndrome decode circuit receives said memory data word syndrome for producing an indication of which of said bits in said retrieved memory data word are in error based upon said full ECC code.

21. A computer system as set forth in claim 19 wherein a directory word syndrome decode circuit receives said directory data word syndrome for producing an indication of which of said bits in said retrieved directory data word are in error based upon said full ECC code.

22. A computer system as set forth in claim 19 wherein a memory word syndrome decode circuit receives said memory data word syndrome for producing an indication of which of said bits in said retrieved memory data word are in error based upon said full ECC code, and wherein a directory word syndrome decode circuit receives said directory data word syndrome for producing an indication of which of said bits in said retrieved directory data word are in error based upon said full ECC code.

* * * * *